(12) United States Patent  (10) Patent No.: US 7,502,053 B2
Kagawa et al.  (45) Date of Patent: Mar. 10, 2009

(54) INFORMATION-PROCESSING DEVICE AND INFORMATION-PROCESSING SYSTEM

(75) Inventors: Keiichrio Kagawa, Ikoma (JP); Jun Ohta, Ikoma (JP); Yuki Maeda, Ikoma (JP); Yasuo Masaki, Ikoma (JP); Hideki Tanabe, Daito (JP); Yasunari Miyake, Daito (JP)

(73) Assignees: Japan Science and Technology Agency, Kawaguchi-shi (JP); National University Corporation NARA Institute of Science and Technology, Ikoma-shi (JP); Funai Electric Co., Ltd., Daito-shi (JP)

( * ) Notice: Subject to any disclaimer, the term of this patent is extended or adjusted under 35 U.S.C. 154(b) by 451 days.

(21) Appl. No.: 11/490,259

(22) Filed: Jul. 21, 2006

(65) Prior Publication Data

US 2007/0070060 A1  Mar. 29, 2007

(30) Foreign Application Priority Data

Jul. 29, 2005  (JP) .............................. 2005-220995
Aug. 23, 2005  (JP) .............................. 2005-241021

(51) Int. Cl.
*H04N 5/228* (2006.01)
*H04N 5/335* (2006.01)
*G01S 3/52* (2006.01)

(52) U.S. Cl. ................. 348/222.1; 348/208.4; 348/294; 345/418

(58) Field of Classification Search ............... 348/222.1, 348/208.4, 294, 241, 362, 370; 345/418–424
See application file for complete search history.

(56) References Cited

U.S. PATENT DOCUMENTS 5,631,697 A * 5/1997 Nishimura et al. .......... 348/172
6,055,012 A * 4/2000 Haskell et al. ................ 348/48
2003/0098915 A1* 5/2003 Hyodo et al ................ 348/252

FOREIGN PATENT DOCUMENTS

JP  A 2001-326857  11/2001

(Continued)

OTHER PUBLICATIONS

Kagawa et al.; "Optical Navigation: a Ubiquitous Visual Remote-Control Station for Home Information Appliances;" Poc. Of Optics Japan, Nov. 2004, pp. 112-113.

(Continued)

*Primary Examiner*—Nhan T. Tran
*Assistant Examiner*—Mekonnen Dagnew
(74) *Attorney, Agent, or Firm*—Oliff & Berridge, PLC

(57) ABSTRACT

For an information terminal to be operated by users for collecting predetermined pieces of information from remote information devices by free-space optical communication, the present invention provides a technique for suppressing the power consumption of the information terminal by minimizing the amount of calculation performed to collect the aforementioned information. According to the present invention, each information device emits ID light on which a low-frequency pilot signal is superimposed. The information terminal captures a series of frames of images including the ID light and locates the ID light within the images by the following steps: (1) creating multiple levels of binned images having different resolutions for each frame of the image; (2) calculating an evaluation index for each pixel within a target range of the binned images at each level, from the lowest to the highest resolution, where the target range is narrowed every time the process switches over to a lower level. In (2), the evaluation index is calculated by an evaluation function including fast Fourier transformation performed throughout the series of frames of images. The evaluation index thus calculated is compared with a threshold to determine whether the pixel concerned is receiving ID light. The present technique significantly reduces the number of pixel to be analyzed and evaluated, thereby decreasing the total number of arithmetic operations to be performed using the evaluation function. Thus, the power consumption is suppressed.

11 Claims, 14 Drawing Sheets

FOREIGN PATENT DOCUMENTS

| | | |
|---|---|---|
| JP | A 2003-258736 | 9/2003 |
| JP | A 2003-323239 | 11/2003 |
| JP | A 2004-112226 | 4/2004 |
| JP | A 2004-235899 | 8/2004 |
| WO | WO 03/036829 | 5/2003 |
| WO | WO 2006/048987 A1 | 5/2006 |

OTHER PUBLICATIONS

Yamamoto et al.; "A CMOS Image Sensor for Capturing Normal Images @ 30fps and ID images @ 1kfps/ID, for the 'Opto-Navi' System;" ITE Technical Report, vol. 29, No. 24, Mar. 2005, pp. 9-12.

Kagawa et al.; "Application of Detection Algorithm of ID Regions Based on Inter-Frame Differences to 'Opto-Navi' System as a Visual Multi-Purpose Remote Controller for Home Information Applicances;" ITE Technical Report, vol. 30, No. 25, Mar. 2006, pp. 29-32.

Oike et al.; "A Smart Image Sensor with High-Speed Feeble ID-Beacon Detection for Augmented Reality System;" Proc. European Solid-State Circuits Conference (ESSCIRC), 2003, pp. 125-128.

\* cited by examiner

SMALL ID-RECEIVING AREA

LARGE ID-RECEIVING AREA

PIXELS TO READ OUT SIGNALS FROM

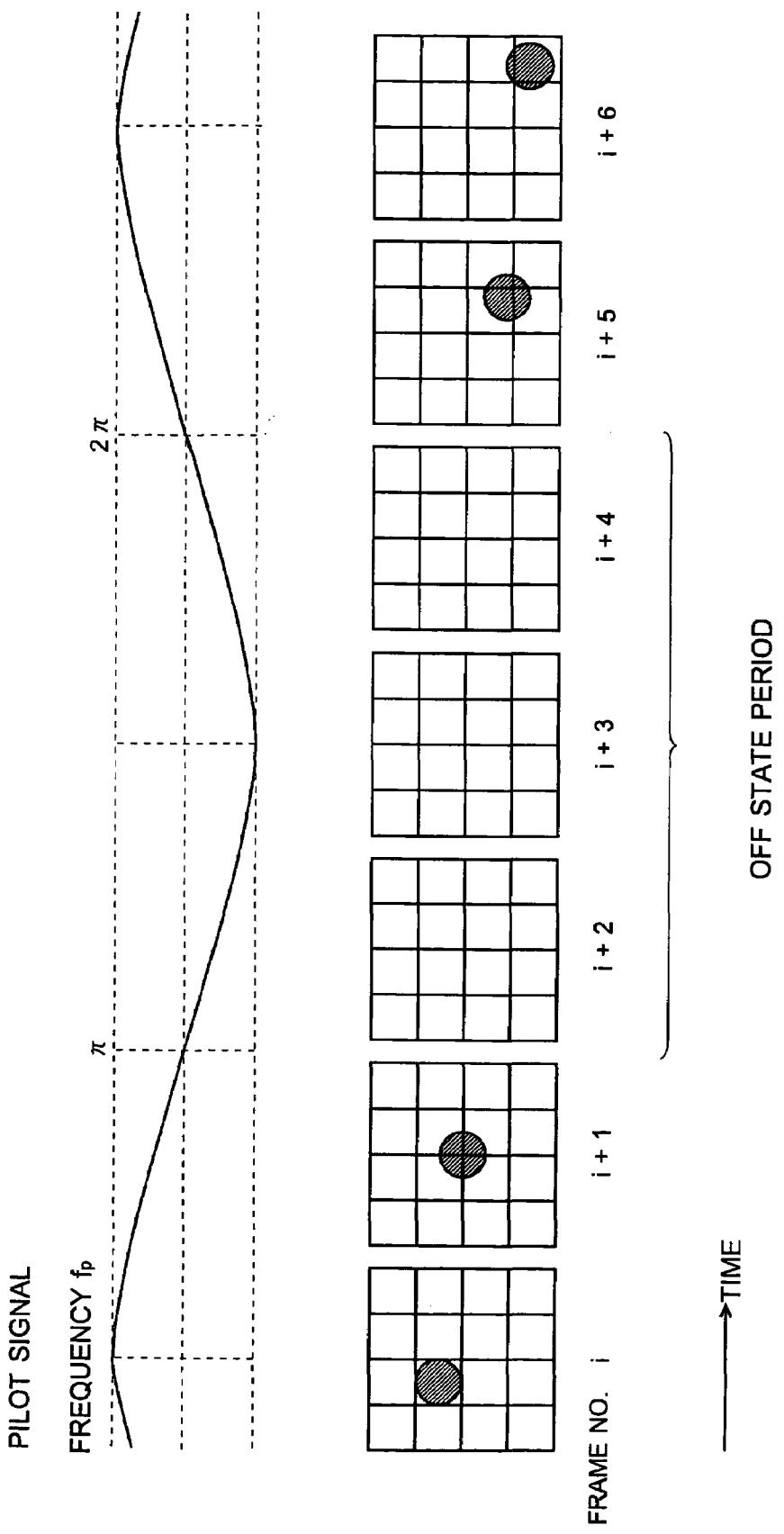

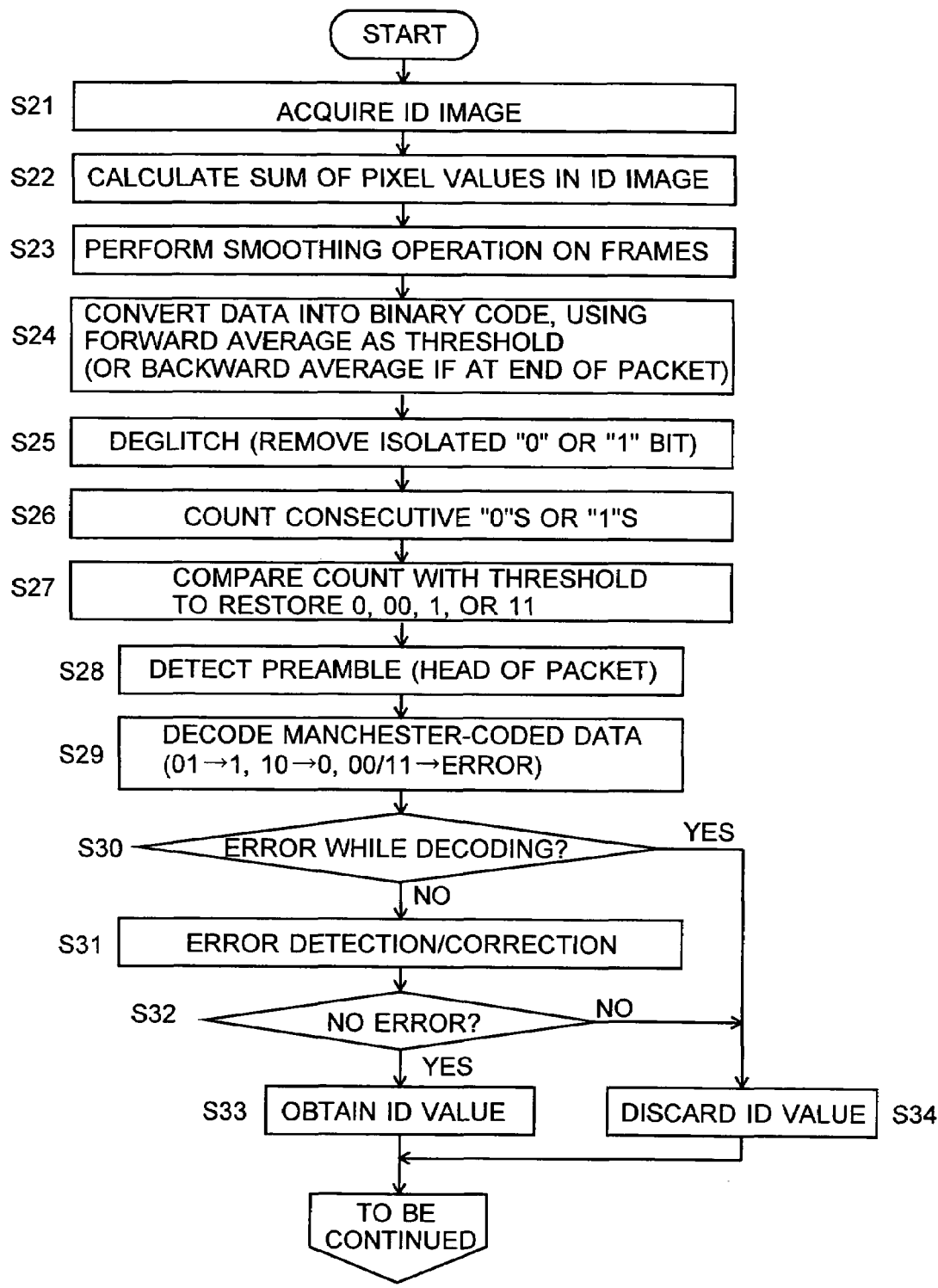

COMMUNICATION MODE FOR RECEIVING ID SIGNAL

COMMUNICATION MODE FOR RECEIVING DATA SIGNAL

COMMUNICATION WITH ACTIVE DEVICE

COMMUNICATION WITH PASSIVE DEVICE

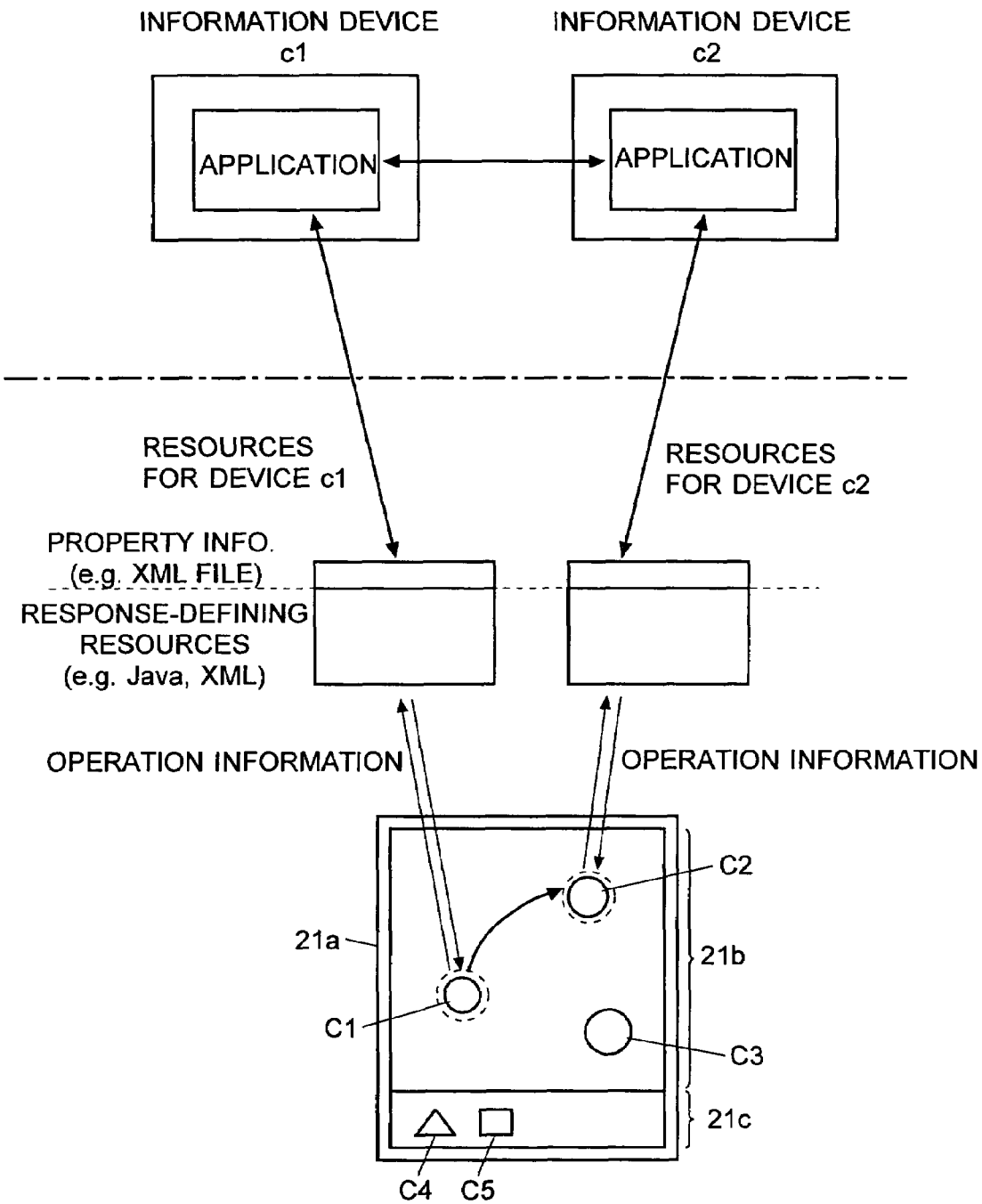

INFORMATION-PROCESSING DEVICE AND INFORMATION-PROCESSING SYSTEM

The present invention relates to an information-processing system that uses an information terminal operated by users to collect predetermined pieces of information from information devices located separately and remotely or to remotely control various types of information devices, in which at least a portion of the information concerned is transmitted by free-space optical communication. The present invention also relates to an information-processing device directly operated by the user in the aforementioned system.

BACKGROUND OF THE INVENTION

In recent years, personal computers have pervaded into people's domestic lives. Other types of digital information devices, such as digital television sets or digital versatile disc (DVD) recorders, are also becoming popular. Under such circumstances, many people are constructing home networks including the aforementioned information devices as their principal components. Meanwhile, refrigerators, microwave ovens and other home appliances that are generally called "white goods" have now advanced features, and efforts are being made to also integrate these appliances into the home network. However, there are various kinds of practical problems to be solved in bringing the home network into popular use. One of the urgent tasks is to provide a user-friendly mechanism for operating the system. Accordingly, it is necessary to develop an easy-to-use user interface.

Nowadays, mobile phones are remarkably spreading their application areas. Many phone models come with digital cameras, some of which also have storage media. Recently, these mobile phones are used as information terminals in various application systems. In such a technical situation, the present inventors and others have proposed a remote control system using a mobile phone having a digital camera, as disclosed in Non-Patent Document 1. This system, called the "OPTO-NAVI" system, uses a mobile phone to create a user interface on which users can visually check various kinds of remote information devices and operate those devices on the screen.

In the OPTO-NAVI system, each information device to be controlled has a light-emitting diode (LED), through which the device transmits optical signals containing identification (ID) information specific to the device and other related information. The mobile phone receives the optical signals through its light-receiving module and recognizes the position of the information device concerned. Then, it displays an image of the surrounding space captured with its digital camera and indicates the position of each remote-controllable information device on the screen. Thus constructed, the OPTO-NAVI system provides an easy-to-use interface for users to operate various devices and appliances included in the home network.

Any information terminal (e.g. mobile phones) compatible with the OPTO-NAVI system has a dedicated image sensor for receiving the optical signals. The present inventors and others proposed such an image sensor in WO 2006/048987 A1, Non-Patent Document 2 and other documents. This sensor is a complementary metal-oxide-silicon (CMOS) image sensor intended to be installed in a mobile phone or other small-size, light-weight information terminals and used to take pictures in normal modes and also receive the aforementioned optical signals and read out the ID information from the signals with minimal power consumption. To satisfy these requirements, the image sensor has the characteristic function of reading out signals from a small number of pixels included in a limited, smaller range of image at a higher frame rate (at least higher than a normal frame rate) as well as the ordinary function of reading out all the pixel signals at the normal frame rate.

More specifically, the CMOS image sensor described in Non-Patent Document 2 can capture up to seven pieces of "ID images" (i.e. small images including one or more pixels receiving the optical signals containing the ID information) of 5×5 pixels at a frame rate of 1.2 kfps (kilo-frames per second) while repeatedly reading out QVGA images (320×240 pixels) at a rate of 30 fps. In this process, the high-speed readout operation is performed only on a limited pixel range surrounding the spot where the optical signals containing the ID information is received. This reduction in the number of pixels speeds up the pixel readout operation and lowers the power consumption.

In addition to the reduction of power consumed by the image sensor, it is important for the OPTO-NAVI system or other similar systems to suppress the power consumed by the signal-processing circuits (including digital signal processors or microcomputers) that locates the aforementioned optical signal containing ID information (this signal is called the "ID light" hereinafter) on the captured image and that receives the ID light. To satisfy this requirement, it is necessary to minimize the amount of calculation performed to locate the targeted ID light on the captured image. Decreasing the amount of calculation will also shorten the time required for locating the reception point of the ID light and enable the information terminal to make quicker responses to operations by the user. There is no conventional technique proposed to reduce the amount of calculation performed for the aforementioned purpose and improve the efficiency of determining the reception point of the ID light on the captured image.

[Non-Patent Document 1] Keiichiro KAGAWA, et al., "Jouhou Kaden No Bijuaru Maruchi Rimokon: Hikari Nabigeishon No Teian (Optical navigation: a ubiquitous visual remote-control station for home information appliances)", *Proc. of Optics Japan* 2004, November 2004, pp. 112, 113

[Non-Patent Document 2] Koji YAMAMOTO, et al. "'OPTO-NAVI' Shisutemu Ni Muketa 30 fps Tsuujou Gazou/1 kfps ID Gazou Douji Satsuzou Kanou Na CMOS Imeeji Sensa (A CMOS Image Sensor for Capturing Normal Images @ 30 fps and ID Images @ 1 kfps/ID, for the "Opto-Navi" System)", *ITE Technical Report*, vol. 29, No. 24, March 2005, pp. 9-12

Taking into account the above-described problem, the present invention intends to provide an information-processing device or information-processing system including an information terminal to be operated by users for collecting predetermined pieces of information from remote information devices by free-space optical communication, where the power consumption of the information terminal is suppressed by minimizing the amount of calculation performed to collect the aforementioned information.

SUMMARY OF THE INVENTION

Thus, the present invention provides an information-processing device having the following functions:

performing free-space optical communication to receive predetermined pieces of information from a remote transmitter device having a light source that emits light containing at least the aforementioned pieces of information;

capturing an image of a certain imaging range; and obtaining position information of the light emitted from the light source of the transmitter device present within the imaging range in parallel with capturing plural frames of images of the same imaging range, and the information-processing device includes:

a) an imaging device including a photo-receiver having a two-dimensional array of normal pixel cells, each of which performs photoelectric conversion, and a readout circuit for reading out a pixel signal produced by the photoelectric conversion at each pixel cell;

b) a binning processor for creating plural binned images having different resolutions from each frame of the image, where each binned image is created using signals of expanded pixel cells, each of which is created by virtually adding pixel signals of adjacent pixel cells selected from all the normal pixel cells of the imaging device;

c) an evaluator for processing the signal of a given normal or expanded pixel cell to determine whether the pixel cell is receiving the light emitted from the light source, by analyzing a predetermined number of frames of images that are temporally adjacent to or in proximity to each other and calculating an evaluation index that reflects the presence of the emitted light; and d) a pixel cell locator for performing a process including the following steps:

(d1) locating one or more expanded pixel cells that are receiving the light emitted from the light source within the binned image having the lowest resolution created by the binning processor, based on the evaluation indexes that the evaluator has given to the expanded pixel cells of the binned image concerned;

(d2) defining a limited range within the binned image having the next lowest resolution, including the one or more expanded pixel cells located in the previous step;

(d3) locating one or more expanded or normal pixel cells that are receiving the light emitted from the light source within the aforementioned limited range of the binned image, based on the evaluation indexes that the evaluator has given to the expanded or normal pixel cells included in the aforementioned limited range; and (d4) returning to step (d2) until one or more normal pixel cells that are receiving the light emitted from the light source are located in step (d3).

In a mode of the information-processing device according to the present invention, the evaluator calculates the evaluation index of each normal or expanded pixel cell by an evaluation function that performs a fast Fourier-transformation on the predetermined number of frames of images.

In the present information-processing device, a binned image having the lowest resolution (i.e. the image having the smallest number of expanded pixel cells) is initially selected as the target image from all the binned images created by the binning processor, and the target image is analyzed to determine whether any expanded pixel cell of the target image includes one or more normal pixel cells that are receiving the emitted light. For example, the device calculates an evaluation index for each expanded pixel cell of the target image and checks whether the calculated value is larger than a predetermined threshold. After one or more expanded pixel cells receiving the emitted light are identified within the lowest resolution image, a narrowed range of the expanded or normal pixel cells is set as the target range of the process in the next step. With the binned image having the one-level higher resolution (in which each expanded pixel cell consists of a smaller number of normal pixel cells) selected as the next target image, the evaluation index of each expanded pixel cell included in the narrowed range is calculated by the evaluation function, and one or more expanded pixel cells receiving the emitted light are identified from the calculated values, as described above.

In general, a fast Fourier-transformation consumes a considerable amount of time, and thus requires a considerable amount of calculation In the aforementioned mode, the total amount of calculation significantly depends on the amount of calculation using the evaluation function. Taking this condition into account, the information-processing device according to the present invention creates multiple levels of binned images having different resolutions and performs the calculation using the evaluation function on the binned images at each level, from the lowest to the highest resolution. Compared to other methods that do not use multiple levels of binned images, the present method reduces the number of normal or expanded pixel cells on which the calculation is to be performed. This leads to a remarkable decrease in the number of times to perform the fast Fourier-transformation to locate the reception point of the light emitted from the light source.

Thus, the reception point of the light emitted from the light source on the captured image, or more specifically, the position of the information device emitting the ID light, can be located by a much smaller amount of calculation. The decrease in the amount of calculation lowers the power consumed by the signal processors (or circuits) of the information terminal used in the OPTO-NAVI system or similar remote control systems. Moreover, it accelerates the process of locating the information device emitting the ID light and thereby contributes to a quicker retrieval of ID information from the information device thus located.

In the information-processing device according to the present invention, the evaluator may use different evaluation functions having different levels of accuracy corresponding to the different levels of resolutions of the images to be evaluated. That is, evaluation of an image having a lower resolution may be performed by an evaluation function that is less accurate but performs only a small amount of calculation, whereas evaluation of an image having a higher resolution may be performed by another evaluation function that is highly accurate but performs a large amount of calculation. This method decreases the amount of calculation particularly when there are many targets to be evaluated and thereby reduces to a greater degree the total amount of calculation.

The predetermined number of frames used as the basis for calculating the evaluation indexes may be temporally adjacent to or in proximity to each other (e.g. at every other frame). Preferably, consecutive frames that are temporally adjacent to each other should be selected. This method increases the correlation between the frames and thereby improves the accuracy of the evaluation indexes.

If an information-processing device according to the present invention is a mobile phone or similar device that is usually operated in user's hand, a camera shake or similar accidental motion is unavoidable. Such a motion causes the light source of the transmitter device to relatively move on the captured images even if the light source is fixed in the actual space. Taking this problem into account, in a preferable form of the present invention, the information-processing device further includes a motion estimator for estimating the direction and/or speed of the relative motion of the light source within the imaging range, based on a series of frames of images created from the pixel signals read out from the pixel cells of the imaging device, and the evaluator calculates the evaluation index after compensating for the motion of the light source on the basis of the motion information estimated by the motion estimator.

Such a motion-compensating process should be performed at each level of the image resolution. In this process, the result of the motion compensation at a higher level (corresponding to a lower resolution) can be reflected in the motion compensation at a lower level (corresponding to a higher resolution) to reduce the amount of motion at the lower level.

For example, the motion estimator may be constructed so that it calculates the cross correlation between consecutive frames of the images and obtains information about the motion from the maximum value of the cross correlation.

The above-described construction suppresses the influence of any accidental motion of the light source caused by a camera shake or similar motion, so that the position of the receiver device can be correctly detected.

The motion estimator may be preferably constructed so that it divides the captured image into plural sections and estimates the motion within each section when the estimation process switches to an image having a higher resolution. This construction improves the accuracy of recognizing the position of each transmitter device if there are plural transmitter devices within the imaging range.

In the information-processing device according to the present invention, the binning process creates a larger allowable range for motion. For example, an 80×60 binned image created from a 320×240 image allows a motion of up to 4×4 pixels. Therefore, if the motion has been compensated for at a higher (or low-resolution) level, it can be assumed that the motion at a lower (or high-resolution) level is smaller than the binning size. Accordingly, the motion estimator may be constructed so that it estimates the amount of motion only within a limited range that includes the extent of uncertainty of the pixel position resulting from the binning process when the estimation process switches to an image having a higher resolution, on condition that a motion-compensating process has been performed on a previous, low-resolution image. This construction facilitates the motion estimation.

In a preferable mode of the information-processing device according to the present invention, the binning processor creates a low-resolution image from a high-resolution image by a binning process in which each expanded pixel cell of the low-resolution image is created from a cell group consisting of a unique subset of the normal or expanded pixel cells of the high-resolution image, where any pair of the expanded pixel cells located adjacent to each other within the low-resolution image has a corresponding pair of the cell groups that partially overlap each other within the high-resolution image.

According to the above construction, even if the area that is receiving the light is spread across the boundary of two or more normal or expanded pixel cells located adjacent to each other within the high-resolution image, the pixel values of the normal or expanded pixel cells located on both sides of the boundary will be reflected in the pixel value of one expanded pixel cell within the low-resolution image. This technique prevents an apparent decrease in the evaluation index calculated as described earlier and prevents the area receiving the light, i.e. the transmitter device, from being unrecognized.

In the information-processing device according to the present invention, the binning processor may logarithmically compress the pixel value of each normal or expanded pixel cell. This construction prevents the loss of information indicating a small change of the pixel value while avoiding an increase in bit number due to an additive operation in the binning process.

The information-processing system according to the present invention includes:

an information-processing device according to the present invention; and one or more transmitter devices, each having a light source for emitting at least a ray of light having a predetermined frequency, and the system is characterized in that:

the transmitter device emits an optical signal containing a pilot signal having a first frequency and an identification signal having a frequency higher than the first frequency and containing information relating to the transmitter device concerned, where the pilot signal and the identification signal are superimposed on different frequency bands of the optical signal; and the information-processing device recognizes the position of the transmitter device by detecting the position of the pilot signal, identifies one or more pixel cells of the photo-receiver of the imaging device of the information-processing device on the basis of the recognized position of the transmitter device, and obtains the identification signal from the pixel signals read out from the identified pixel cells.

This system can correctly locate each transmitter device on the basis of the pilot signal and obtain identification information of the transmitter device. This information can serve as a key to retrieving various kinds of additional information to be used for identifying each transmitter device, discriminating plural transmitter devices or other purposes. Examples of the additional information include graphical icons for constructing a graphic user interface on which users can easily control each transmitter device through a corresponding icon displayed on the captured image.

BRIEF DESCRIPTION OF THE DRAWINGS

FIG. 14 is a conceptual diagram for explaining a process that the information terminal of the embodiment performs to deal with the blinking of the light emitter when it detects a pilot signal.

FIG. 15 is a flowchart of the ID-decoding process performed by the information terminal of the embodiment.

FIG. 19 is a diagram illustrating how the remote control system shown in FIG. 1 controls the information devices in response to an operation performed by the user on the information terminal.

EXPLANATION OF NUMERALS

1 ... Information Terminal
   10 ... Imaging/Photo-Receiving Unit
   11 ... Image Sensor
   12 ... Lens
   13 ... ID Data Receiver
   14 ... ID Position Detector
   15 ... Image Data Processor
   16 ... Communication Establisher
   20 ... Main Controller
   21 ... Display
   21a ... Screen
   21d ... Identification Information
   22 ... Operation Unit
2 ... DVD Recorder
3 ... Personal Computer
4 ... Digital Camera
5 ... Portable Music Player
6 ... Digital Television Set
7 ... Network
8 ... Resource Center

DETAILED DESCRIPTION OF A PREFERRED EMBODIMENT

Figure 1:
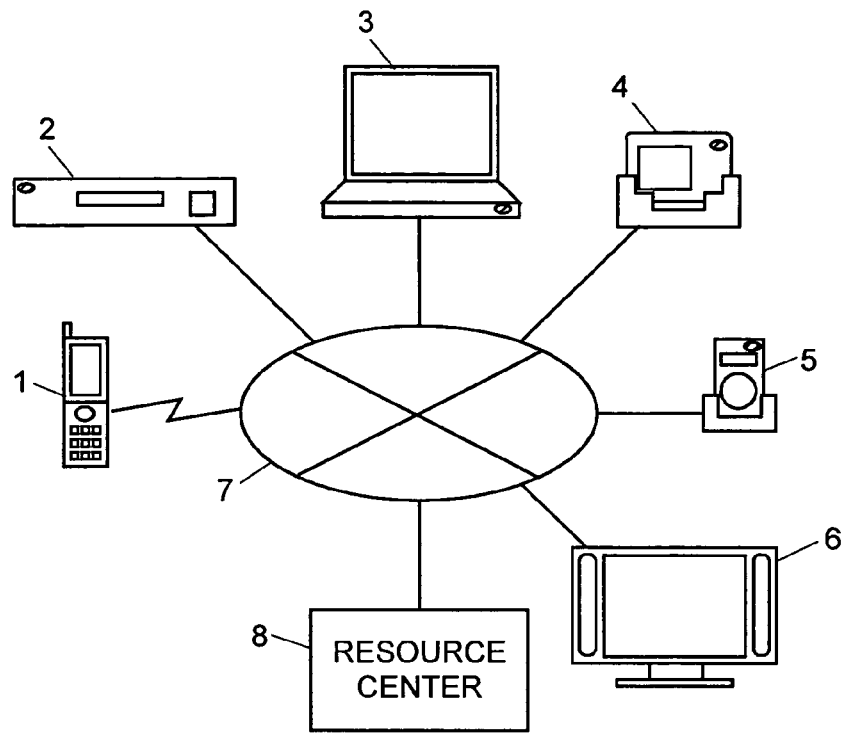
FIG. 1 is a conceptual diagram showing the overall construction of a remote control system as an embodiment of the information-processing system according to the present invention.

This section describes a remote control system as an embodiment of an information-processing system, which uses an information-processing device according to the present invention. FIG. 1 shows the overall construction of the present remote control system.

In FIG. 1, the information terminal 1, which is an essential component of the present system, is a mobile phone having various functions including the free-space optical communication function to be described later. The system includes a DVD recorder 2, personal computer 3, digital camera 4, portable music player 5, digital television set 6 and other devices, all connected to a home network 7 (naturally, an external network may be used instead), and a resource center 8 is also connected to the same network 7. This network 7 can take any form as long as it allows the aforementioned devices to communicate with each other; it may or may not include a server or similar administration device that helps other devices connect to each other. The connection between the network 7 and each device may be wired or wireless. Other types of devices that are not listed above can be also controlled by the present system.

The resource center 8 holds various resources associated with each information device. The "resources" hereby include definition information of each information device, a simple image (e.g. an icon) of each information device to be displayed on a screen, a control program (typically, a Java™ application) that runs on the information terminal 1 to create a user interface for each information device and communicate with or take control of the device. The program may take the form of a behavioral description written in a programming language or a markup language. The resource center 8 may be a computer on which one or more server programs are running, or it may be a simple storage media, e.g. a flash memory device (e.g. a memory card with a built-in flash memory chip).

Figure 2:
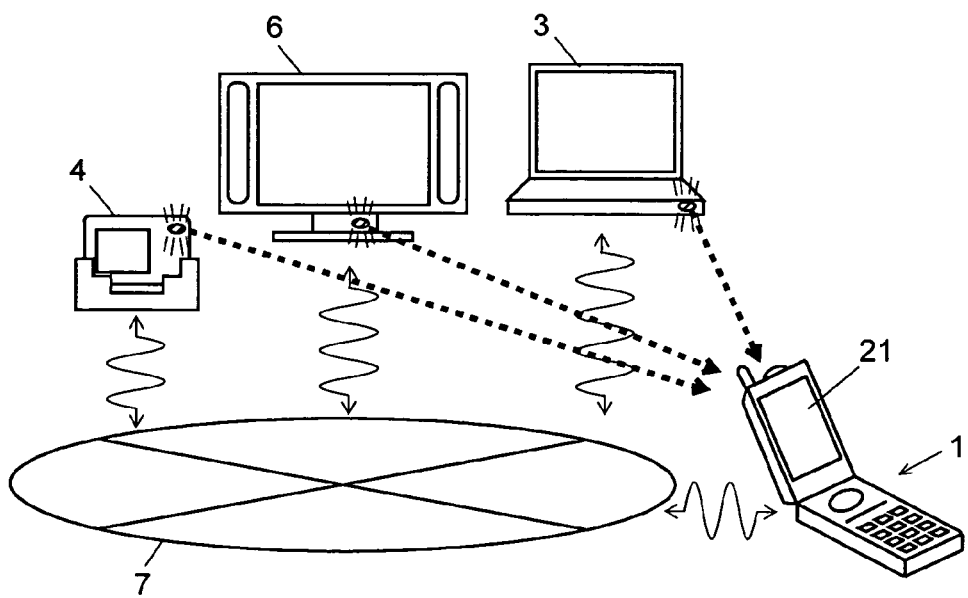
FIG. 2 is a schematic diagram showing a mode of using the remote control system shown in FIG. 1.

FIG. 2 is a schematic diagram showing a mode of using the remote control system shown in FIG. 1. In the present example, the user has the information terminal 1 at hand, and the personal computer 3, digital camera 4, and digital television set 6 are located in front of the user and are directly visible by the user. These information devices, each being wirelessly connected to the home network 7, have a light emitter for sending ID information to the information terminal 1. The wireless communication may use radio waves or infrared light, such as the wireless local area network (LAN), Bluetooth™ or any other known communication techniques. Naturally, it is possible to use a wired LAN network. Use of the network 7 as the substantial medium for sending and receiving data makes it possible to exchange a large amount of data faster than in the case where the data are transferred only by the free-space optical communication via the information terminal 1.

Figure 17A:
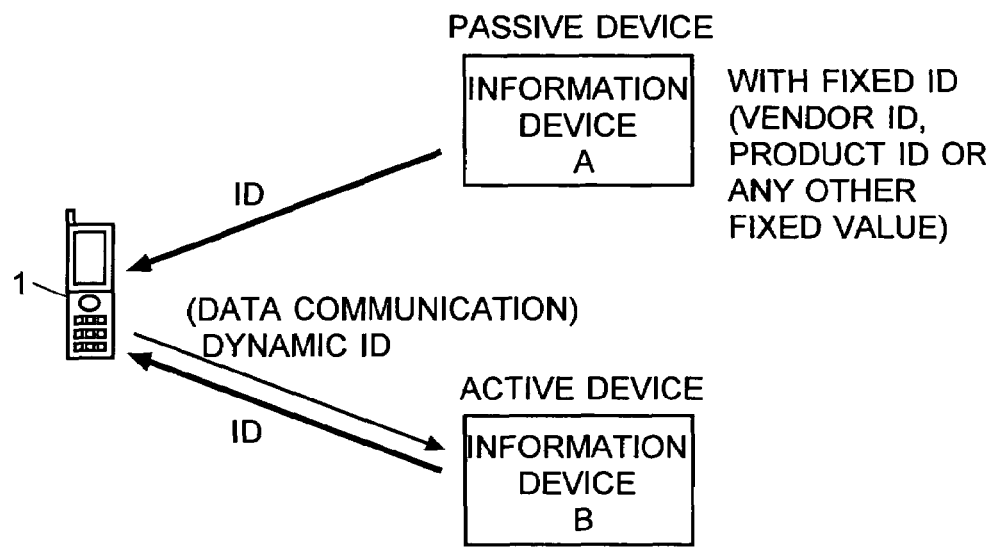
FIGS. 17A and 17B are conceptual diagrams showing two modes of communication between the information terminal and the information devices within in remote control system shown in FIG. 1.
Figure 17B:
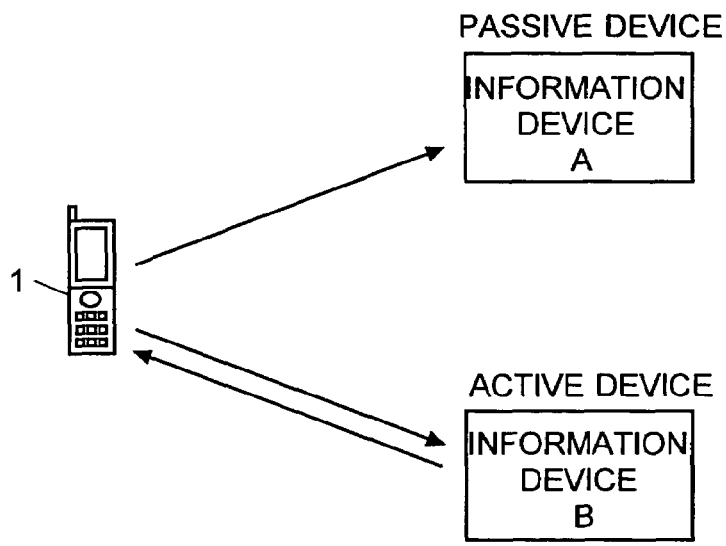

The following paragraphs explain an example of functions realizable with the remote control system shown in FIGS. 1 and 2. Each information device to be controlled by the information terminal 1 minimally has the function of emitting an optical signal that contains a pilot signal indicating the location of the information device and an ID signal indicating the ID code of the device. Other kinds of data are transferred through the network 7 without using the free-space optical communication. The information devices can be categorized into two groups: passive and active. FIGS. 17A and 17B show the difference between passive and active devices in terms of the sequence of communicating with the information device 1. A passive device, denoted as "Information Device A" in FIGS. 17A and 17B, is capable of receiving control signals but incapable of bidirectional communication of data signals. In contrast, an active device, denoted as "Information Device B", can receive control signals and also perform bilateral communication of data signals (FIG. 17B). Both passive and active devices can send an ID signal to the information terminal 1 (FIG. 17A).

In the present remote control system, it is necessary to activate each information device to establish a communication link with the information terminal 1 before the data communication is started between them. The sequence of establishing the connection link depends on whether the counterpart is a passive or active device. FIG. 18B illustrates the start-up sequence for passive devices.

Initially, the information terminal 1 sends an activation signal to the information device A (passive device) through the network 7. Upon receiving the activation signal, the information device A emits an optical ID signal on which a pilot signal having a lower frequency is superimposed. The information terminal 1 detects the pilot signal superimposed on the ID signal by a process to be detailed later. Based on this pilot signal, the information terminal 1 recognizes the position of the information device A within its imaging range and then receives and decodes the ID signal having a higher frequency. The ID signal contains a vender identification code, product type identification code, serial number and other kinds of ID information that are unique to each information device. Based on these kinds of information, the information terminal 1 identifies the information device A and sends an inquiry to the resource center 8 through the network 7 to download resources associated with the information device A. The resources thus downloaded are stored in the internal memory of the information terminal 1. Thus, the information terminal 1 obtains the resources relating to the information device A.

The initial transmission of the activation signal from the information terminal 1 is not always necessary. However, without the activation signal, the passive devices need to generate optical ID signals at all times, which is a waste of power. Therefore, it is more preferable to energize the light source to generate the optical signal for the first time after the activation signal is received.

Figure 18A:
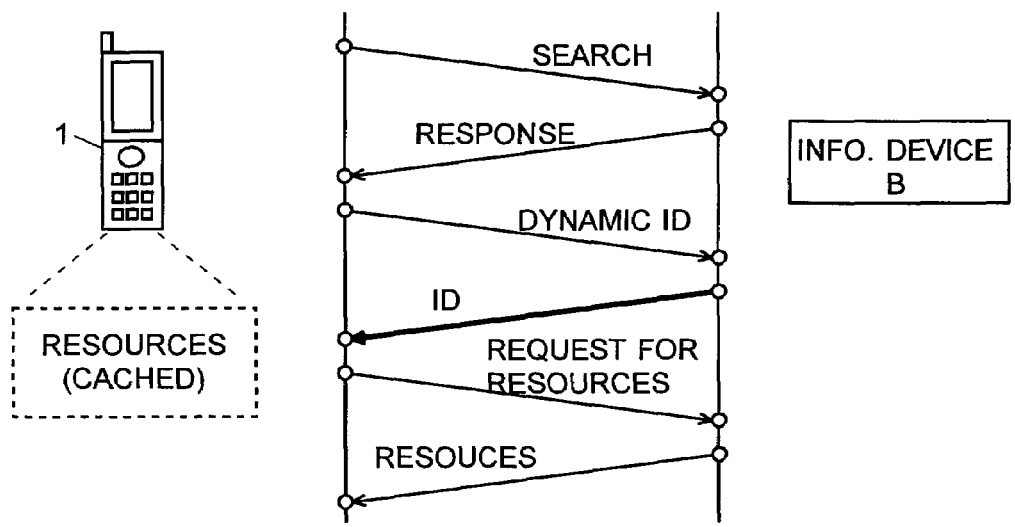
FIGS. 18A and 18B are drawings illustrating two modes of start-up sequences of the remote control system shown in FIG. 1.
Figure 18B:
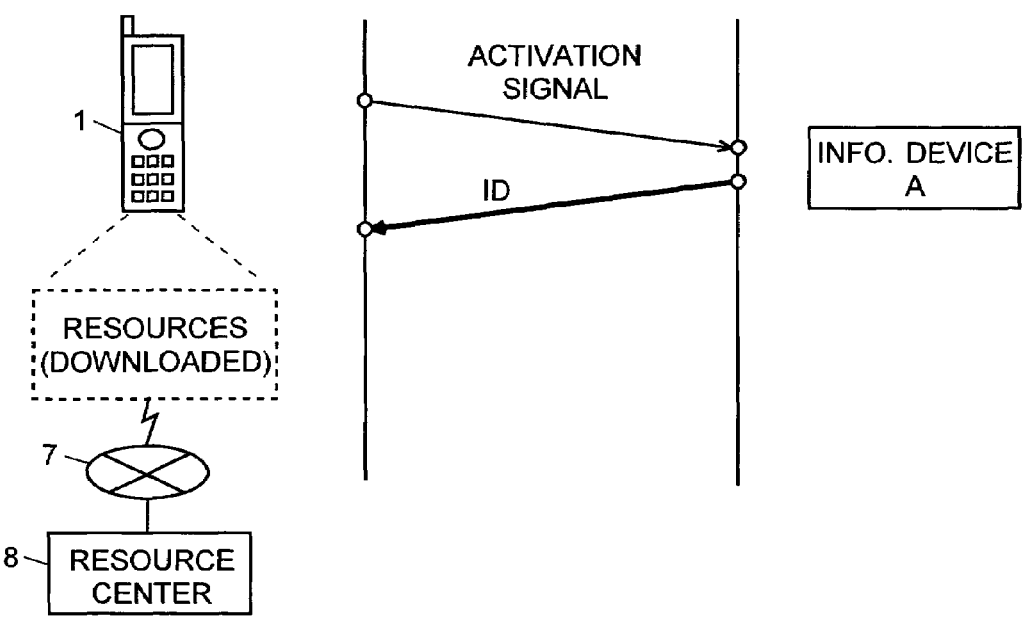

FIG. 18A illustrates the start-up sequence for active devices. Initially, the information terminal 1 sends a search signal to each information device B (active device) through the network 7. The search signal corresponds to the activation signal in FIG. 18B. To send the search signal, the user performs a certain operation. For example, the user may use a Web browser running on the information terminal to in turn send a search signal to a common gateway interface (CGI) program for a Web server running on the information device B. In another possible case, the information terminal 1 uses the user datagram protocol (UDP) to simultaneously send a search signal to all the information devices B.

Upon receiving the search signal, each information device B sends a response signal to the information terminal 1 through the network 7. The response signal contains property information stored in the information device B. Based on the response signals, the information terminal 1 recognizes the presence of remote-controllable information devices around the information terminal 1 (where they may be "physically" surrounding the information terminal 1 in the real space or "virtually" on the network). Then, referring to the property information, the information terminal 1 sends an inquiry to the resource center 8 to download resources relating to each identified information device. The resources thus downloaded through the network 7 are temporarily stored in the internal memory of the information terminal 1. Subsequently, the information terminal 1 assigns a unique ID (or address) to each information device B that has responded to the search signal and sends the ID information to the device concerned. The IDs hereby assigned to the information devices are unfixed, temporary ones, which may be changed, for example, every time the devices are activated. In the following description any type of information that enables the discrimination of multiple information devices is generally called the "ID", including temporary addresses.

With an ID thus assigned, each information device B emits an optical ID signal. The information terminal 1 receives the ID signal and extracts the pilot signal superimposed on it, as described earlier. Based on this pilot signal, the information terminal 1 recognizes the position of the information device B and then receives and decodes the ID signal having a higher frequency. Reception of the optical ID signal confirms that the information device B emitting that signal is within the imaging range of the information terminal 1 and should be displayed on the screen. Other information devices B whose optical ID signals are not received should be outside the screen. The bidirectional data communication performed before the reception of the ID signals does not provide any information for determining which information devices B are within the imaging scope of the information terminal 1 and which are not.

Subsequently, the information terminal 1 refers to the property information and checks the validity of the resources stored in the memory. If the resources are invalid (e.g. if the version number included in the property information stored in the cached data is older than that included in the property information obtained from the information device B), the information terminal 1 sends the information device B a request for transmission of the resources. Upon receiving this request, the information device B sends its resources to the information terminal 1. Usually, resources are much larger in data size than the ID signal or other information. Therefore, they should be compressed before transmission. The information terminal 1 stores the newly received resources into the memory in place of the older ones and makes the new resources accessible for the subsequent processes. It is preferable that resources relating to Java™ applications or other control programs are executed immediately after they are downloaded for allowing users to operate it at any time. Nevertheless, the present invention also allows on-demand execution of the control programs.

Optical ID signals from the information devices B outside the imaging range do not reach the information terminal 1. Based on the recognition that these devices are not displayed on the screen, the information terminal 1 can receive their ID signals through the network 7 and perform the same process as described earlier. In the present remote control system, the user will usually hold the information terminal 1 so that the information device to be operated comes into the imaging scope of the information terminal 1. Taking this situation into account, it is recommendable to give higher priorities to the information devices located within the imaging range so that the resources for an information device having a higher priority can be retrieved earlier. This method increases the apparent speed of downloading the resources.

As described thus far, the information terminal 1 retrieves resources associated with each information device A or B. FIG. 19 illustrates how the information terminal 1 remotely controls the information devices according to the user's operations, using the retrieved resources.

In FIG. 19, the icons C1, C2 and C3 in the upper section 21b of the screen 21a of the information terminal 1 represent three information devices located within the imaging range. The two icons C4 and C5 in the lower section 21c of the screen 21a represent two information devices that have been found on the network 7 but outside the imaging range. These icons corresponding to the information devices are created using image files and other data included in the previously retrieved resources. Suppose that the information devices c1 and c2 represented by the icons C1 and C2 are a portable music player and a stereo audio system and the user is going to transfer a music file from the portable music player c1 to the stereo audio system c2 to play music.

When the user performs a certain operation on the icon C1, the information terminal 1 runs a control program (e.g. a Java™ application) associated with the information device c1. This control program displays the artist's name, the name of the album (or song) and other information relating to each piece of music data stored in the portable music player cl.

These pieces of information are available from the resources associated with the information device c1 and stored in the information terminal 1. On the screen 21a, the user selects one or more pieces of information on the screen and moves the icon C1 onto the icon C2 by an operation equivalent to the commonly known "drag and drop" operation. Upon this operation, the information terminal 1 sends control signals corresponding to the above operation through the network 7 to the information devices c1 and c2, by using a function of the response-defining resources included in the resources for the information devices c1 and c2 stored in the information terminal 1.

The description thus far is based on the assumption that there was only one information terminal 1 used in the system. In practice, however, two or more information terminal 1 may be simultaneously used within the same system. This means that an information device that has already had an ID assigned from one information terminals 1 can be also selected as a target of another information terminal. In this case, the control process will be confused if plural information terminals assign different IDs to the same information device. One solution to this problem is to construct the system so that any information device that has already had an ID assigned by an information terminal sends an optical signal containing that ID to another information terminal when it has received an access (or search signal) from the latter information terminal. Using the ID thus notified, the latter information terminal can control the information device concerned.

In the remote control system described thus far, the user needs to operate the information terminal at hand, using icons displayed on the screen and application software programs executed through the icons, to operate remote information devices. In this regard, operating icons and programs on a small device such as a mobile phone is not always the best idea. For example, if the information device to be controlled is a personal computer with a graphical operating system installed, it will be easier and more convenient to operate icons and programs on the large screen of the computer, using a mouse or other pointing device. In view of such a situation, it is preferable to construct the information terminal so that it can function as a pointing device for remotely operating a personal computer or similar information devices.

For example, the information terminal may detect horizontal and vertical changes in the position of the pilot signal or the ID signal within the imaging range and send the changes to the information device as the motion-controlling variables of the pointing device. The information device in turn moves the pointer (e.g. a mouse cursor) on the screen according to the motion-controlling values. The information terminal also recognizes key operations (e.g. clicking, double-clicking and so on) by the user and sends the information device a control signal corresponding to the operation performed. Upon receiving the control signal, the information device generates a corresponding event. The information terminal may also send the information devices a signal that indicates an operation of the four-way key, which may be inherently or additionally provided to the information terminal. This signal will make the pointer move in the corresponding direction. Any of the constructions described in this paragraph will enable the user to control the operating system of a remote personal computer by a simple operation of the information terminal at hand.

In the system described earlier, the icons corresponding to the information devices were superimposed on the image captured by the camera and displayed on the screen of the information terminal at hand. Use of a head mount display (HMD) will provide another possibility for displaying the icons. In one method, the HMD is provided with an ID camera for detecting the pilot signals and the ID signals emitted from the information devices. The icon and other visual information corresponding to each information device are displayed on the screen of the HMD so that they overlap with the corresponding information device actually viewed within the real space through the transparent screen of the HMD. With the HMD mounted on the user's head, the user can perform various operations using eye control, a joystick, keys and so on. This construction provides a user interface in which a virtual world (i.e. icons and other visual information) created on the computer is naturally fused with the real world (i.e. the image of the real space).

Figure 3:
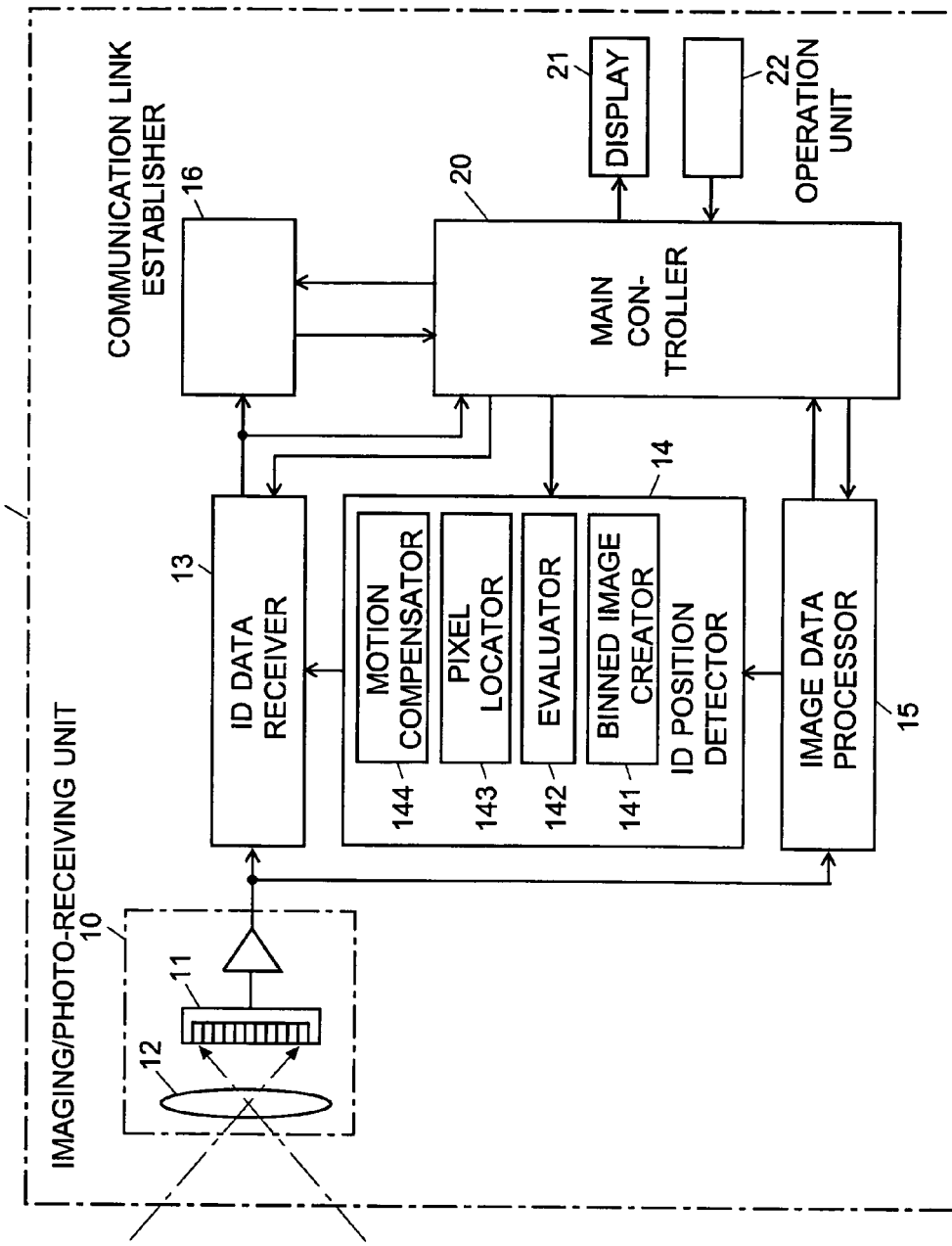
FIG. 3 is a block diagram showing the main components of the built-in optical communication module of the information terminal in the system shown in FIGS. 1 and 2.

The following description details the information terminal used in the remote control system described thus far. The information terminal 1 corresponds to the information-processing device in the present invention. FIG. 3 is a block diagram showing the construction of the main components of the built-in optical communication module of the information terminal 1.

The information terminal 1 has an imaging/photo-receiving unit 10 including a lens 12 and an image sensor 11. The image sensor 11, which corresponds to the imaging device in the present invention, is a CMOS image sensor having a two-dimensional array of small photo-receiving elements (i.e. pixel cells). To process the signals (pixel signals) read out from the pixels of the image sensor 11, the terminal 1 also has the following circuits: an image data processor 15 for creating a two-dimensional image of the entire imaging range; an ID data receiver 13 for decoding pixel signals read out from one or more pixels to extract ID information; and an ID position detector 14 for identifying a pixel cell that is receiving ID light within the captured image, by a process to be described later, to extract pixel ID information. The ID position detector 14 includes a binned image creator 141, which corresponds to the binning processor in the present invention; an evaluator 142, which corresponds to the evaluator in the present invention; a pixel locator 143, which corresponds to the pixel cell locator in the present invention, and a motion compensator 144, which corresponds to the motion estimator in the present invention. The information terminal 1 also includes a communication link establisher 16, a main controller 20, and an operation unit 22 and a display 21, both being connected to the main controller 20. The communication link establisher 16 performs operations necessary for establishing a communication link between the information terminal 1 and each information device on the basis of a signal obtained by the ID data receiver 13. The main controller 20 controls the communication and performs operations relating to the communication.

Each information device (e.g. a personal computer 3) has a light source (an optical beacon) that emits an optical signal (ID light) containing the ID information specific to the information device concerned. An existing LED indicator for indicating the power ON/OFF state of the information device may be used as the optical beacon or a dedicated light source may be added.

The light emitted from the optical beacon may be visible or infrared light, where infrared light is more preferable in many cases. When infrared light is used, the image sensor 11 of the information terminal 1 should be preferably a color sensor in which one unit of image consists of four types of pixels: red (R), green (G), blue (B) and infrared (IR) or its complementary color. These pixels may be arrayed in a bayer pattern or a stripe pattern. Such a construction makes it possible to remove visible components of light from the target signals (i.e. near infrared signals) to improve the accuracy of detecting the pilot signal or ID signal.

Figure 5:
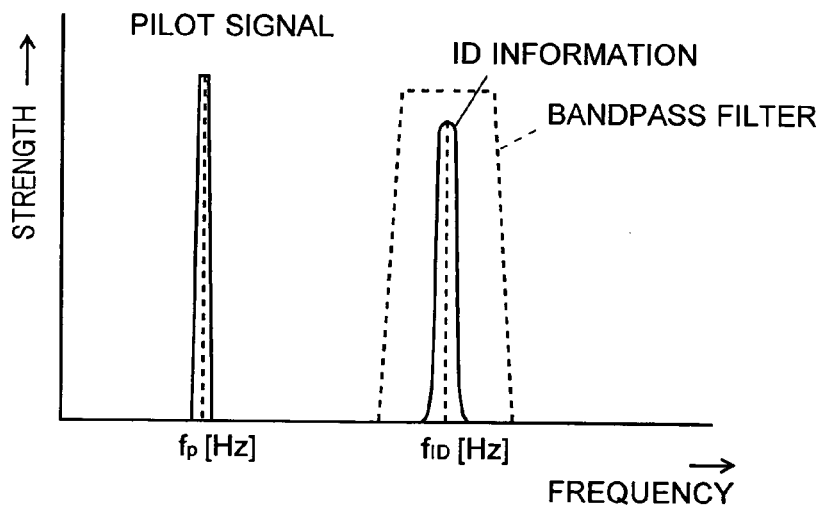
FIG. 5 is a schematic diagram showing the frequency spectrum of ID light emitted from the optical beacon of an information device.
Figure 6:
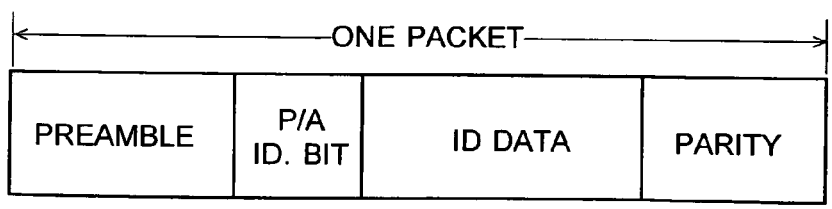
FIG. 6 is a view showing an example of the frame format of one packet of an ID signal transmitted from each information device to the information terminal.

FIG. 5 a schematic diagram showing the frequency spectrum of an optical signal emitted from the optical beacon of an information device, and FIG. 6 is a view showing an example of the frame format of one packet of an ID signal sent from each information device to the information terminal 1.

In the present embodiment, the pilot signal periodically blinks (or changes its strength) at a frequency $f_p$, which is lower than one half of 30 Hz, the normal image frame frequency. In general, all the information devices use the same pilot signal. The principal function of the pilot signal is to make its position recognized by the counterpart of the communication, i.e. the information terminal 1. Therefore, it is possible to use a pilot signal having a higher frequency, depending on the method of detecting the pilot signal to be detailed later. The periodic blinking is not mandatory; it is also possible to blink the signal in an irregular pattern or emit the light only in response to an external request. The ID signal is spread over a frequency range around $f_{ID}$, which is much higher than the frequency $f_p$ of the pilot signal. The ID signal contains information for identifying each information device, e.g. an inherent address specific to each information device or a temporary address assigned to each information device only during the communication process.

As shown in FIG. 6, the ID data (e.g. the inherent address) is inserted into a sequence of data constituting one packet of the ID signal. In each packet, the ID data is preceded by a P/A identification bit, which indicates whether the information device is a passive or active device (the distinction between passive and active devices will be explained later). The P/A identification bit and the ID data are followed by a parity code (or any other type of error detection/correction code) for error detection. Further, a predetermined preamble signal is added to the head of the packet. For example, the preamble consists of a 9-bit string of "111 111 110", which enables the receiver to detect the head of each packet. The packet thus created is then digitally modulated by a method compatible with the characteristics of the transmission channel and repeatedly transmitted as an optical signal. In the present case, the packet is transmitted as a Manchester-encoded optical signal, for example.

In the present embodiment, the frequency $f_p$ of the pilot signal is 5 Hz, which can be detected with the image readout frame rate of 30 fps, and the frequency $f_{ID}$ of the ID signal is 400 Hz, which can be detected at a much higher sampling frequency of 1.2 kfps. The ID information transmitted is a temporary ID of about 8 bits in data length. These values are mere examples and may be changed according to necessity. For example, the ID information may have a much longer bit length as in the case of inherent addresses used in the Internet Protocol Version 6 (IPv6) communication. It may also contain property information, such as the data indicating the operating conditions of the information device concerned.

Figure 4:
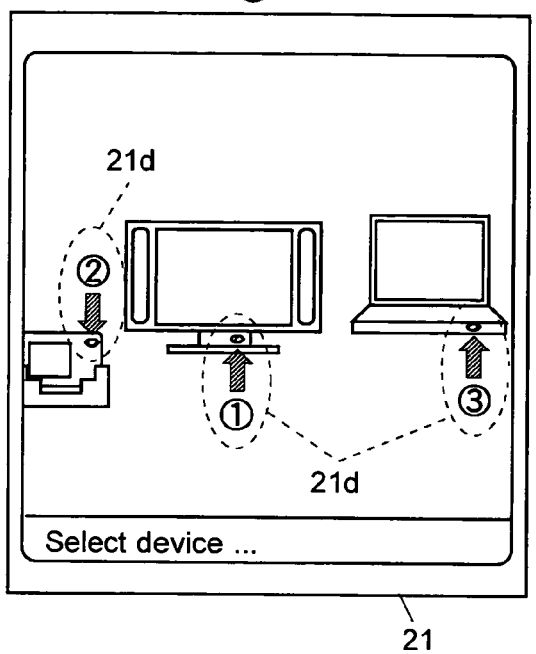
FIG. 4 is a diagram showing an example of the image on the screen of the information terminal shown in FIG. 3.

In the remote control system shown in FIG. 2, the user directs the imaging/photo-receiving unit (i.e. camera) 10 of the information terminal 1 to the information device that he or she wants to control. Then, in the information terminal 1, the image data processor 15 captures images at the frame rate of 30 fps, and the main controller 20 displays a two-dimensional image of the space within the imaging range of the imaging/photo-receiving unit 10 on the screen of the display 21, as shown in FIG. 4. Simultaneously, the ID position detector 14 detects within the captured image the optical beacon of each information device running by identifying one or more pixel cells receiving a pilot signal within the imaging image (this process will be detailed later). The ID data receiver 13 reads out pixel signals from pixel cells included in a small area around the position of the optical beacon at 1.2 kfps to extract and decode ID information from the ID light. Upon receiving the ID information, the main controller 20 identifies the type of information device concerned and displays identification information 21d in proximity to the position of the optical beacon on the screen of the display 21. The identification information 21d serves as a user interface for selecting a desired information device.

The information devices displayed on the screen (i.e. the digital camera 4, digital television set 6 and personal computer 3 in FIG. 4) are accessible from the information terminal 1 to retrieve ID information. In other words, these devices are controllable from the information terminal 1. Therefore, the user can perform key operations on the information terminal 1 to select one or more information devices and send commands to the selected devices through the network 7 or other medium to perform various operations. For example, it is possible to transfer image data stored in a memory card of the digital camera 4 to the digital television set 6 to display photographic images on the screen of the digital television set 6.

Figure 7:
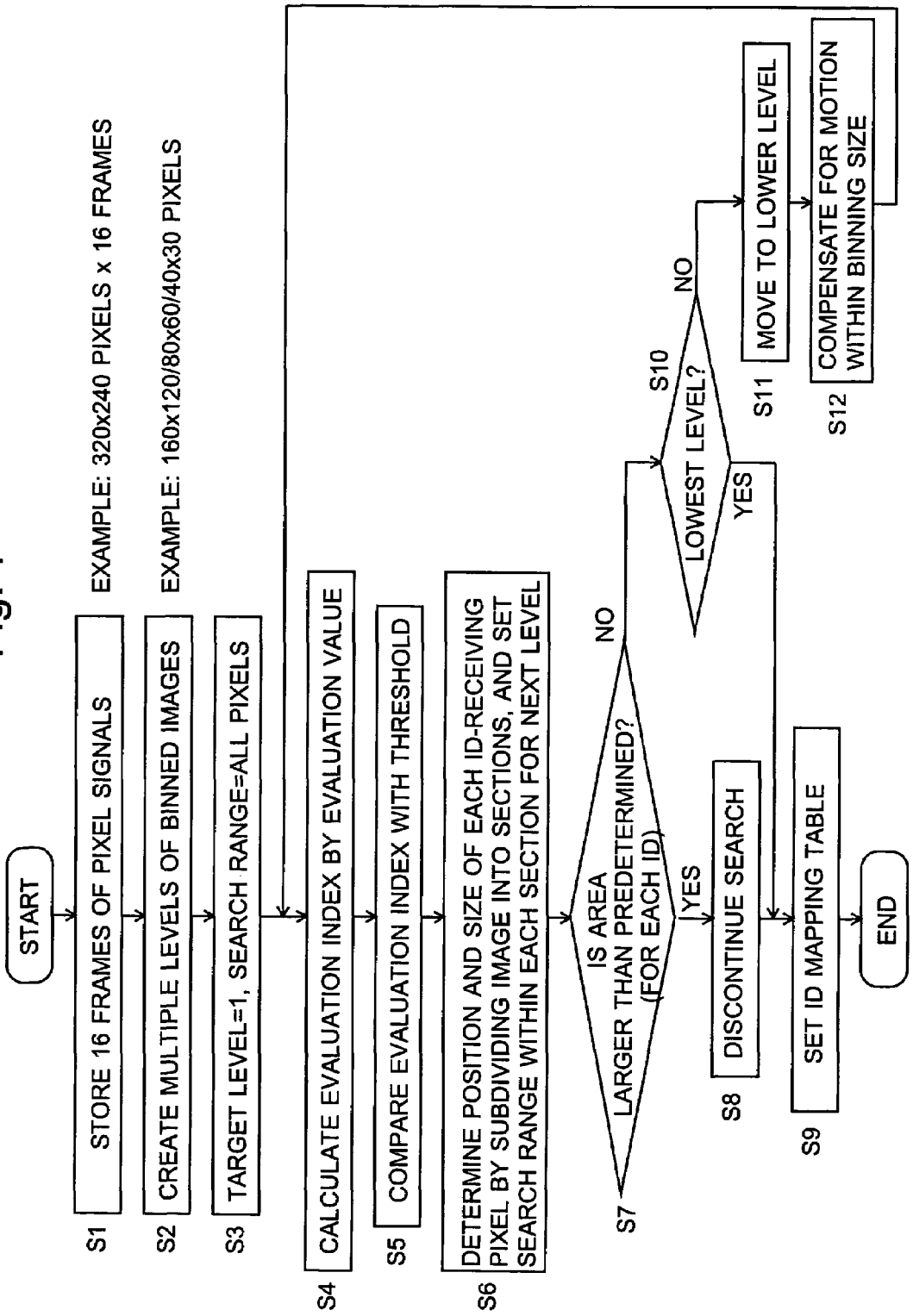
FIG. 7 is a flowchart showing how the information terminal of the embodiment detects a pilot signal.
Figure 8:
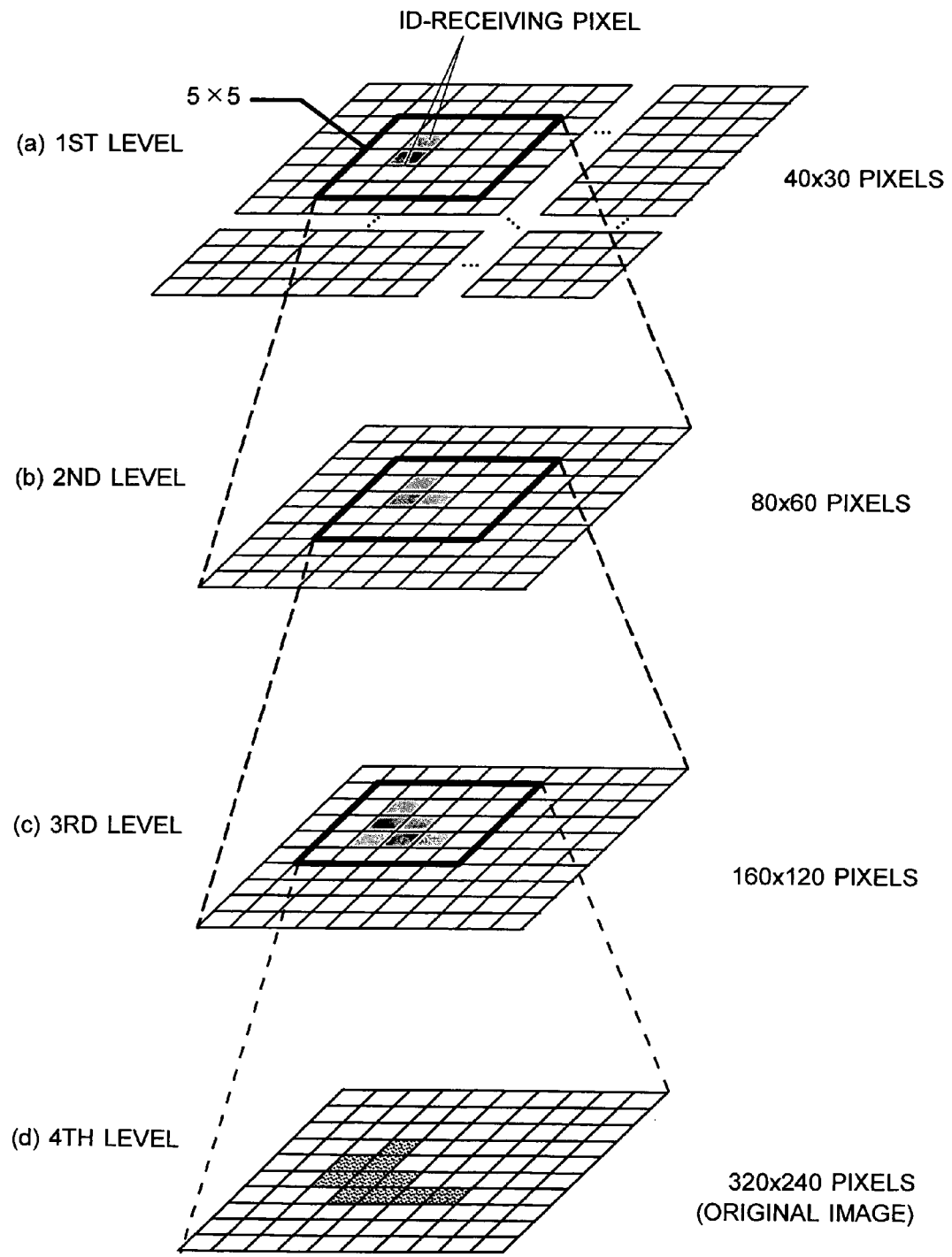
FIG. 8 is a conceptual diagram for explaining how the information terminal of the embodiment detects a pilot signal.
Figure 9:
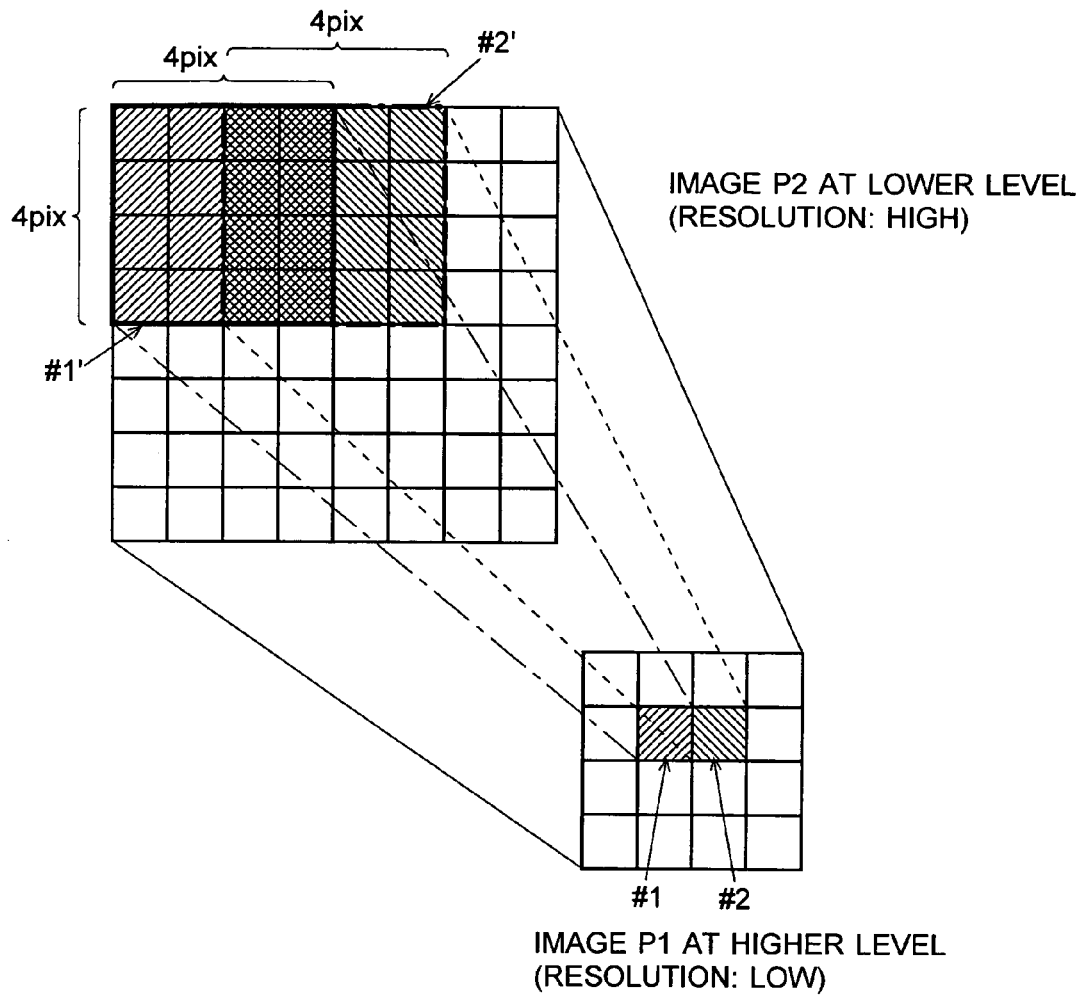
FIG. 9 is a conceptual diagram for explaining a binning process that the information terminal of the embodiment performs when it detects a pilot signal.
Figure 10:
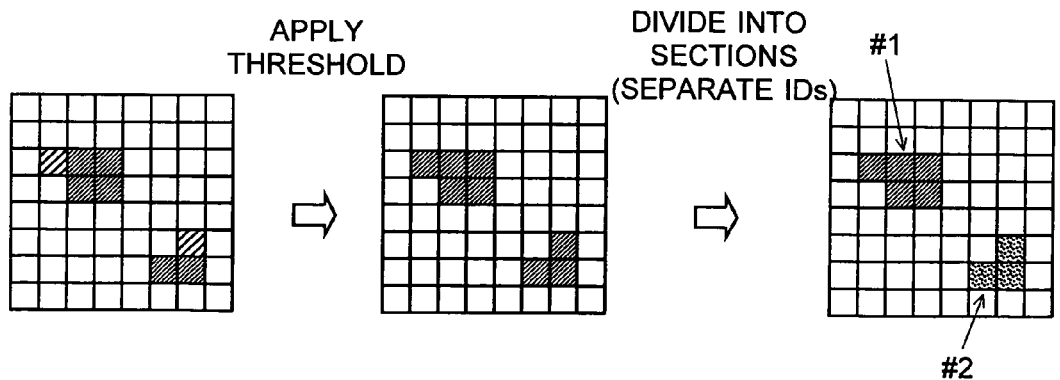
FIG. 10 is a conceptual diagram for explaining how the information terminal of the embodiment determines separate ID areas when it detects plural pilot signals.
Figure 11:
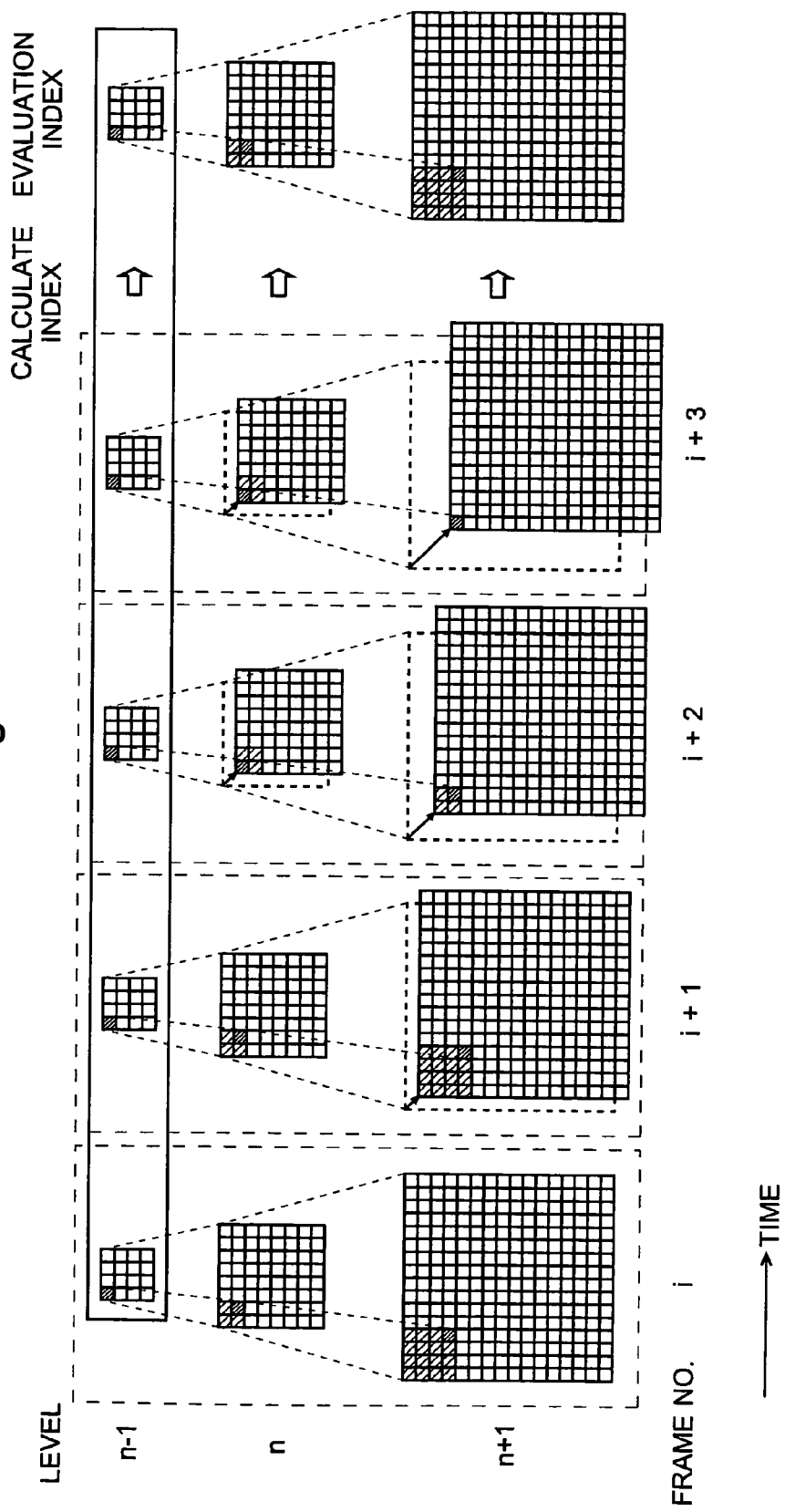
FIG. 11 is a conceptual diagram for explaining a motion-compensating process the information terminal of the embodiment performs when it detects a pilot signal.
Figure 12:
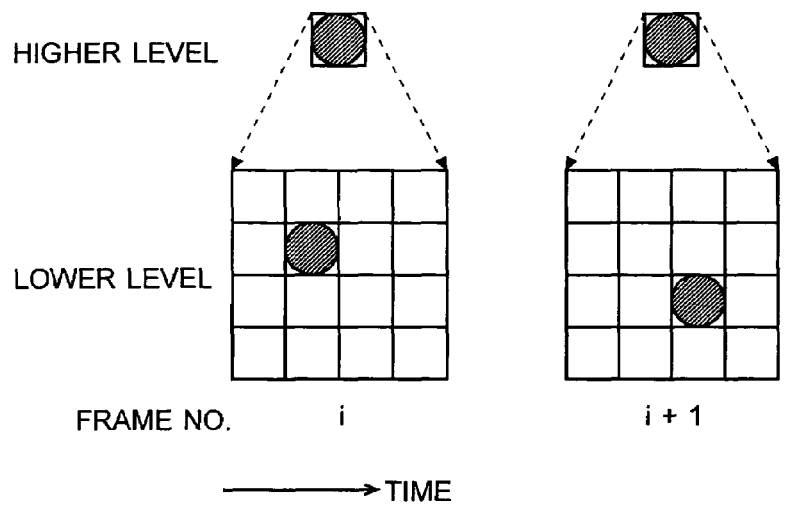
FIG. 12 is a conceptual diagram for explaining the motion-compensating process that the information terminal of the embodiment performs when it detects a pilot signal.

As described earlier, the information terminal 1 captures two-dimensional images with the imaging/photo-receiving unit 10 and then detects each optical beacon within each two-dimensional image with the ID position detector 14. The most important feature of the information terminal 1 exists in the method of detecting the optical beacon, or more specifically, the pilot signal that makes the optical beacon recognizable. The following section describes the method of detecting the pilot signal, with reference to FIGS. 7-12 and 14, where FIG. 7 is a flowchart showing the method of detecting the pilot signal, FIG. 8 is a conceptual diagram for explaining the method of detecting the pilot signal, FIG. 9 is a conceptual diagram for explaining the binning process performed when the pilot signal is detected, FIG. 10 is a conceptual diagram for explaining the method of determining ID areas when the pilot signal is detected, FIGS. 11 and 12 are conceptual diagrams for explaining a motion-compensating process performed when the pilot signal is detected, and FIG. 14 is a conceptual diagram for explaining a process performed to deal with the blinking of the light emitter when the pilot signal is detected.

To correctly determine the position of the pilot signal within the captured image, the evaluator 142 in the present embodiment uses the following equation (1) as the function p(x, y) for evaluating pilot signals:

$$p(x, y) = \frac{|g(f_{PILOT})|^2}{\sum_{f \neq f_{PILOT},0} |g(f)|^2} \quad (1)$$

where x and y are the coordinates of each pixel, f is the frequency, g(f) is the result of the fast Fourier transformation performed on frequency f over a predetermined number of consecutive frames, and $f_{PILOT}$ is the frequency of the pilot signal (5 Hz in the present case). Any pixel whose evaluation index by equation (1) is larger than a predetermined threshold is regarded as a normal or expanded pixel cell that is receiving the pilot signal.

The evaluation by equation (1) is highly accurate. However, performing the evaluation on all the pixels one after another totally requires an extraordinary amount of time because Fourier transformation generally requires a large amount of calculation. Taking this problem into account, the present method includes a hierarchical binning process to reduce the total number of pixels to be subject to the evaluation. Starting from the original image, the binning process creates multiple levels of images having different resolutions, in which an image having a lower resolution is created from the previous image having a higher resolution by bundling a certain number of adjacent elements (or pixels) within the previous image.

When the process of detecting the pilot signal is started, the binned image creator 141 of the ID position detector 14 stores all the pixel signals of a predetermined number of temporally adjacent, consecutive frames (Step S1). In the present example, one round of the binning process handles sixteen frames of images and the original image to be processed is a QVGA image (320×240 pixels). Therefore, the total number of pixel signals to be stored is 320×240×16. Next, the binning process is performed using the stored pixel signals to create multiple levels of images having different resolutions (Step S2). Typically, a 2×2 binning process is repeated (n−1) times to create n-levels of different images. The present example assumes that n=4, so that the binning process is repeated three times.

Specifically, as shown in FIG. 8, from an original image of 320×240 pixels ((d) in FIG. 8), three levels of binned images are created: (c) 160×120 pixels, (b) 80×60 pixels and (a) 40×30 pixels. The pixel cells of each binned image are virtual pixel cells (called the "expanded pixel cells" in this specification) created by bundling a certain number of pixel cells of the original image. In the following description, the binned image having the lowest resolution of 40×30 pixels is called the first level, and the other three images, including the original one, are called the second, third and fourth levels in the ascending order of resolution.

The binning process includes the following characteristic steps: For example, suppose that the 10-bit values of four pixel cells in two rows and two columns are added to create one pixel (i.e. expanded pixel cell) of an image at a higher level having a lower resolution. Normally, the adding operation handles four adjacent pixels (2×2) as a group to create one (expanded) pixel cell, whereas the present method adds the values of sixteen adjacent pixels (4×4). FIG. 9 illustrates this process, in which a 4×4 pixel range #1' is set as a target of the adding operation within the image P2 at a lower level to obtain the pixel value of one expanded pixel cell #1 within the image P1 at a higher level. Also, another 4×4 pixel range #2' is set as a target of the adding operation within the image P2 to obtain the pixel value of another expanded pixel cell #2 next to the previous pixel cell #1 within the image P1. The two ranges #1' and #2' overlap each other by an area of 2×4 pixels. This means that the values of these 2×4 pixels are reflected in the pixel value of each of the expanded pixel cells #1 and #2.

Thus, the present method defines partially overlapped ranges for adding pixel values within an image at a lower level to create an image at a higher level. This technique eliminates the boundaries of the ranges and thereby prevents the light coming from the optical beacon from spreading across the boundary and being split into two expanded pixel cells in the resultant image at the higher level. Such a situation should be avoided because the strength of the light could be underestimated and mistakenly regarded as smaller than the threshold.

Adding sixteen pieces of 10-bit pixel values within the image P2 at the lower level increases the bit number of the information by 4 bits (4×4) and resultantly yields a 14-bit pixel value for one expanded pixel cell of the image P1 at the higher level. In a normal binning process, the resultant pixel value is rounded off to a 10-bit value to save the memory space or for other purposes. However, the present method accepts the increase in the bit number by actually applying the increased bit number to the pixel data at the higher level instead of rounding off the value. This approach maintains information indicating the slightest change in the pixel value and eventually improves the accuracy of detecting the position of the pilot signal.

To save the memory space while maintaining information indicating a small change in the pixel value, it is possible to logarithmically compress the pixel value of the binned image from the 14-bit value to a 10-bit value.

Among the multiple levels of binned images created thus far, the pixel locator 143 selects the first level as the target to search for the position at which ID light is received (this position is called the "ID-receiving position" hereinafter) and sets a search range that covers all the pixels of the image at the target level (Step S3). Thus, the search for the ID-receiving position starts from the binned image at the first level having the lowest resolution. After the search is started, the evaluator 142 selects each of the sixteen frames of binned images at the first level one after another and calculates the evaluation index for each of the 40×30 expanded pixel cells constituting the selected image, using the evaluation function (1) (Step S4). Among the 40×30 expanded pixel cells, any expanded pixel cell including one or normal pixel cells that are receiving a pilot signal (or illuminated by ID light) from an information device has a higher evaluation index. Accordingly, the pixel locator 143 compares each evaluation index with a predetermined threshold to locate an expanded pixel cell whose evaluation index is higher than the threshold (Step S5). Such an expanded pixel cell is called the "ID-receiving pixel" hereinafter.

Subsequently, the pixel locator 143 determines the position and size of each ID-receiving pixel and defines a clipping range of m×m pixels, including the ID-receiving pixel, as the search range for the next level (Step S6). If, as in the area #1 or #2 in FIG. 10, multiple ID-receiving pixels detected in Step S5 are tightly adjacent to each other, each area #1 or #2 is regarded as a single "ID-receiving area". Then, the pixel locator 143 sets a search range including that area, as shown in FIG. 8(a) where a range of 5×5 expanded pixel cells (m=5) is set as the search range for the next level. If the ID light is simultaneously received from more than one information device, there will be more than one ID-receiving area discretely located on the binned image. In such a case, a separate search range can be set for each ID-receiving area. Then, the pixel locator 143 estimates the size of each ID-receiving area from the number of normal pixel cells included in the ID-receiving area concerned and determines whether the size is larger than a predetermined value (Step S7).

For any ID-receiving area whose size is larger than predetermined, it is allowable to determine that the ID-receiving position has been accurately located and discontinue the search process for that position (Step S8). The reason follows: Suppose that the binning process uses a binning size of $N_{BX} \times N_{BY}$ to produce a low-resolution image. Then, presence of an ID-receiving area having a size equal to or larger than, for example, 2×2 pixels at the n-th level will automatically ensure that its size will be equal to or larger than $(2N_{BX}^{n-1}) \times (2N_{BY}^{n-1})$ at the lowest level. Therefore, if $(2N_{BX}^{n-1}) \times (2N_{BY}^{n-1})$ is larger than the threshold, it is allowable to discontinue the search at the n-th level and skip the subsequent levels as far as that ID-receiving area is concerned.

If the ID-receiving area at an ID-receiving position is smaller than predetermined, the pixel locator 143 checks whether the current level is the lowest, i.e. the fourth level in the present case (Step S10). If the current level is the lowest, the pixel locator 143 discontinues the search and records the final located position of the ID-receiving pixel into an ID-mapping table provided in the image sensor 11 to locate the position (or coordinates) of ID-receiving pixels (Step S9). The ID-mapping table is used to locate pixels that are receiving ID light and repeatedly read out signals from those pixels at a high speed.

In Step S10, if the current level is not the lowest, the search process further proceeds down to the next level, from the first to second, second to third, or third to fourth level (Step S11). Then, the motion compensator 144 performs a motion-compensating process to compensate for a motion of the ID light on the image (Step S12). After the motion compensation, the process returns to Step S4 to again follow the above-described steps, now on the next image having a higher resolution, to detect ID-receiving pixels within the new clipping range, which was originally defined in Step S6 and then modified by the motion-compensating process in Step S12. For example, suppose that the process has moved from the first to second level. Since m=5 in the present case, the binned image at the second level, having a one-level higher resolution, has a search range of 10×10 normal pixels, and the evaluation process using the same evaluation function is to be performed on that range, as shown in FIG. 8(*b*). Thus moving through lower levels (or higher-resolution-images) one after another, the process described thus far is repeated until the position of the ID-receiving pixel is located with adequately high accuracy.

In practice, the information terminal 1 undergoes a camera shake when it is operated in user's hand. The camera shake causes the ID-receiving pixel to move within the photo-receiving area of the image sensor 11. The speed of the motion, which is much slower than the frame frequency of the images, is relatively inconsequential in low-resolution images. However, at higher resolutions, the motion of the ID-receiving pixel throughout the sixteen frames of images may have a considerable effect. The motion-compensating process in Step S12 is intended to suppress such a negative influence.

For motion compensation, a motion vector that reflects the direction and amount of the motion should be calculated. For example, a pixel range including the moving range of the ID-receiving position is defined for each pair of neighboring frames at the next level, and the cross correlation between the two frames is calculated to find a motion vector that gives the largest cross correlation value. For example, suppose a binning process in which $N_{BX} \times N_{BY}$ pixels are added to create a low-resolution image at the second level. In the present case, the level number is n=2, so that $N_{BX}=N_{BY}=4$ (see FIG. 12).

On condition that the results of the motion-compensating processes performed until the (n−1)-th level is reflected in the image at the n-th level, it can be estimated that the motion at the n-th level is within the range from $-(N_{BX}/2)$ to $+(N_{BX}/2)$ in the horizontal direction and from $-(N_{BY}/2)$ to $+(N_{BY}/2)$ in the vertical direction. Based on this estimation, the cross correlation between the temporally neighboring frames (i-th and (i+1)-th) to find a motion vector $m_i$ that gives the maximum cross correlation value. It should be noted that cross correlation requires a considerable amount of calculation including multiplying operations. One approach in avoiding this problem is to use the sum of absolute differences between the corresponding pixels of the two frames as the evaluation function.

The motion vector $m_i$ can be used to estimate the direction and speed of the motion of the ID-receiving position. In the motion-compensation process, the result of the estimation is used to modify the clipping range for each frame of the image before calculating the evaluation index using the evaluation function. FIG. 11 illustrates this process. At the (n−1)-th level, the light-receiving area is located at the same (expanded) pixel cell in all the frames. However, at the lower levels (n-th and (n+1)-th), its motion within the clipping range with the progress of the frame (i, i+1, i+2 and i+3) is revealed due to the increase in resolution. In such a case, if the motion is not compensated for, or if the clipping range of the image is maintained during the calculation of the evaluation index throughout the predetermined number of image frames, the evaluation index of the light-receiving area is smaller than it should be, so that the area will be easily missed. To avoid this problem, the clipping range defined in each frame of the image at the lower (n-th and (n+1)-th) levels is shifted according to the direction and amount of the motion indicated by the motion vector $m_i$ (represented by the arrows in FIG. 11) so that the motion is cancelled, as drawn by the broken lines in FIG. 11. As a result, in every frame of the image, the light-receiving area will be located at the same normal or expanded pixel within the clipping range. Use of these images having the modified clipping ranges prevents the evaluation index from being underestimated due to a camera shake or similar motion.

The example shown in FIG. 11 assumes a uniform shift of the entire image. In practice, it is possible to calculate a motion vector for each subdivided section of the lower level image corresponding to each expanded pixel cell of the upper level image and perform the motion-compensating process for each subdivided section. This method can reduce the influence of a more complex motion and thereby improve the accuracy of the evaluation index.

The motion-compensating process also needs to take into account the OFF-period of the optical beacon, which is blinking at a low frequency according to the pilot signal. FIG. 14 illustrates a method of dealing with the blinking of the optical beacon. In FIG. 14, the image of frame number i is the first of the sixteen frames of the images to be evaluated. The image of frame number i has a motion vector $m_i$ in relation to the previous image of frame number (i−1). Under such conditions, the timing of the blinking (on/off) of the optical beacon can be detected using two kinds of information, as described below.

The first information is the frequency $f_p$ of the pilot signal, which can be detected when the evaluation index is calculated with the evaluation function for one level higher image. The frequency $f_p$ contains a fast Fourier transformation component $g(f_p)$, and the on/off cycle of the optical beacon can be determined from the phase of $g(f_p)$. In practice, the optical beacon turns on and off every other phase of $\pi$, as shown in FIG. 14. The second information is the maximum value of the cross correlation between neighboring frames, which is calculated when the amount of motion is determined in the motion-compensating process. For example, a decrease in the cross correlation value across the threshold suggests that the optical beacon has turned off. These two kinds of information make it possible to determine the on/off state of the optical beacon and change the mode of motion-compensating process accordingly. For example, when the optical beacon is on, the motion vector can be calculated from the maximum cross correlation value between the neighboring image frames, as described earlier. When the state of the optical beacon has changed, the process switches to another mode in which, for example, the nearest preceding motion vector substitutes for a new motion vector to be calculated. As another example, a new motion vector can be calculated by computing the maximum cross correlation between the current image and the modified image created one cycle earlier. Thus, it is possible to compensate for the motion without being affected by the blinking of the optical beacon.

The process of detecting the position of ID light described thus far remarkably reduces the amount of calculation of the evaluation index using equation (1). Suppose that the resolution of the original image is $N_X \times N_Y$ and the maximum number of IDs that can be simultaneously received is $n_{ID}$. Without the hierarchical binning process described thus far, it is necessary to perform the calculation using equation (1) $N_X \times N_Y$ times. In contrast, if the hierarchical binning process is performed, the calculation using equation (1) needs to be performed only $(N_X \times N_Y/4^{n-1}) + 4m^2(n-1)n_{ID}$ times. For example, on the condition that the original image is a 320×240 QVGA image, $n_{ID}$ is seven and the ID image size (m×m) is 5×5, the calculation using equation (1) needs to be performed 79,360 times if the hierarchical process is not performed, whereas a three-level hierarchical binning process reduces the number of the calculation to 6,360, not more than one tenth of the former value. A four-level binning process further decreases the number, down to 3,340. Thus, the process described earlier drastically reduces the amount of calculation to be performed for identifying one or more pixels that are receiving ID light on the image sensor 11.

Although the above description assumed that the same evaluation function is applied to all the levels having different resolutions, it is possible to apply different evaluation functions to different levels. At the first stage of the hierarchical searching process, all the pixels (or expanded pixel cells) of an image having the lowest resolution need to be examined. Therefore, it is recommendable that an evaluation function that is less accurate but requires only a small amount of calculation is used for a low-resolution image, whereas another evaluation function that requires a large amount of calculation but is more accurate is used for a high-resolution image having a narrowed pixel range. This method further reduces the total amount of the calculation.

After the ID-receiving pixel (the position of the light received from the optical beacon) is located as described thus far, the ID signal is to be read out at a high speed within a narrowed range including the ID-receiving pixel. The flowchart in FIG. 15 shows the process of decoding the ID data.

Figure 13A:
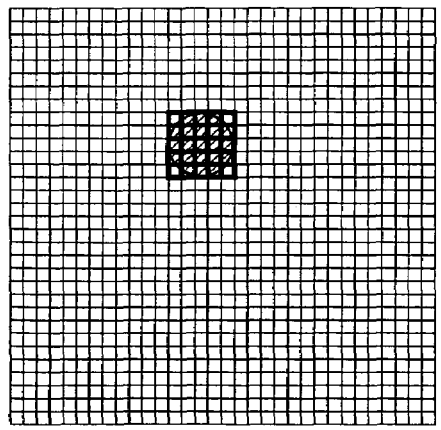
FIGS. 13A and 13B are conceptual diagrams for explaining a pixel-skipping process that the information terminal of the embodiment performs when it decodes ID information.
Figure 13B:
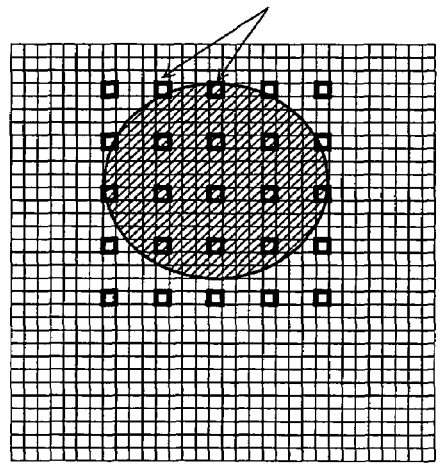

First, a series of ID images are obtained by quickly (at a rate of 1.2 kfps in the present case) and repeatedly reading out pixel signals from a specific range of pixel cells on the basis of the position information of the ID-receiving signals recorded in the ID-mapping table (Step S21). If, as shown in FIG. 13A, the ID-receiving area is relatively small, it is possible to read out the signals from all the pixels of the specified range including the ID-receiving pixel. In contrast, if the ID-receiving area is large as shown in FIG. 13B, the area may include too many pixels. In such a case, it is allowable to skip several pixels at appropriate intervals to reduce the number of pixels from which the signals are to be read out.

Then, the sum of all the pixel values read out is calculated (Step S22), and a smoothing operation among several frames are performed to reduce the influence of the noise (Step S23). After the smoothing operations, the pixel values are sequentially arrayed in the order of the frames, and each pixel value is compared with a threshold and converted into a binary code (Step S24). Typically, either a forward average (the average of a predetermined number of data located forward) or a backward average (the average of a predetermined number of data located behind) of the received data is used to determine the threshold for the binary coding process. In the present case, the backward average is used at the end of the packet and the forward average at the other portion of the packet.

In another method for binary coding, each positive shift (0 to 1) or negative shift (1 to 0) is detected with a 0→1 shift detection filter and the intermission between positive and negative shifts is filled with one or more 0s or 1s to produce a binary string. The 0→1 shift detection filter calculates correlation by a correlation kernel, a kind of matrix that looks like $\{-1, -1, -1, 1, 1, 1\}$ if one bit is represented by three consecutive frames.

In principle, the present coding method does not allow the presence of an isolated bit of "1" or "0" that consists of only one frame of "1" or "0". Therefore, after the binary coding process, a deglitching process is performed to remove such isolated bits (Step S25). Subsequently, the number of consecutive 0s or 1s is counted (Step S26), and the number is compared with a threshold to restore "0", "1", "00", or "01" (Step S27). For example, if the count of 0s or 1s is smaller than five, the 0s or 1s are converted to "0" or "1", whereas, if the count is equal to or larger than five, the 0s or 1s are converted to "00" or "11".

The data string thus obtained is then searched for a predetermined preamble signal (e.g. 111 111 110) to locate the head of the packet (Step S28). After the head of the packet is found, the bit string that follows the preamble is Manchester-decoded (Step S29). This decoding process converts "01" to "1" and "10" to "0", while regarding "00" or "11" as a decoding error ("YES" in Step S30). If no decoding error has been encountered, an error detection/correction is performed using the error detection (or correction) code (Step S31).

If a decoding error occurred in Step S30 or an error was detected in Step S31 (or an unrecoverable error occurred during an error correction), the ID signal is unreliable, so that the ID value is discarded (Step S34). If none of the two types of errors is encountered, the ID value is chosen as a reliable result (Step S33). Thus, the information terminal 1 retrieves the ID information from each information device.

Figure 16:
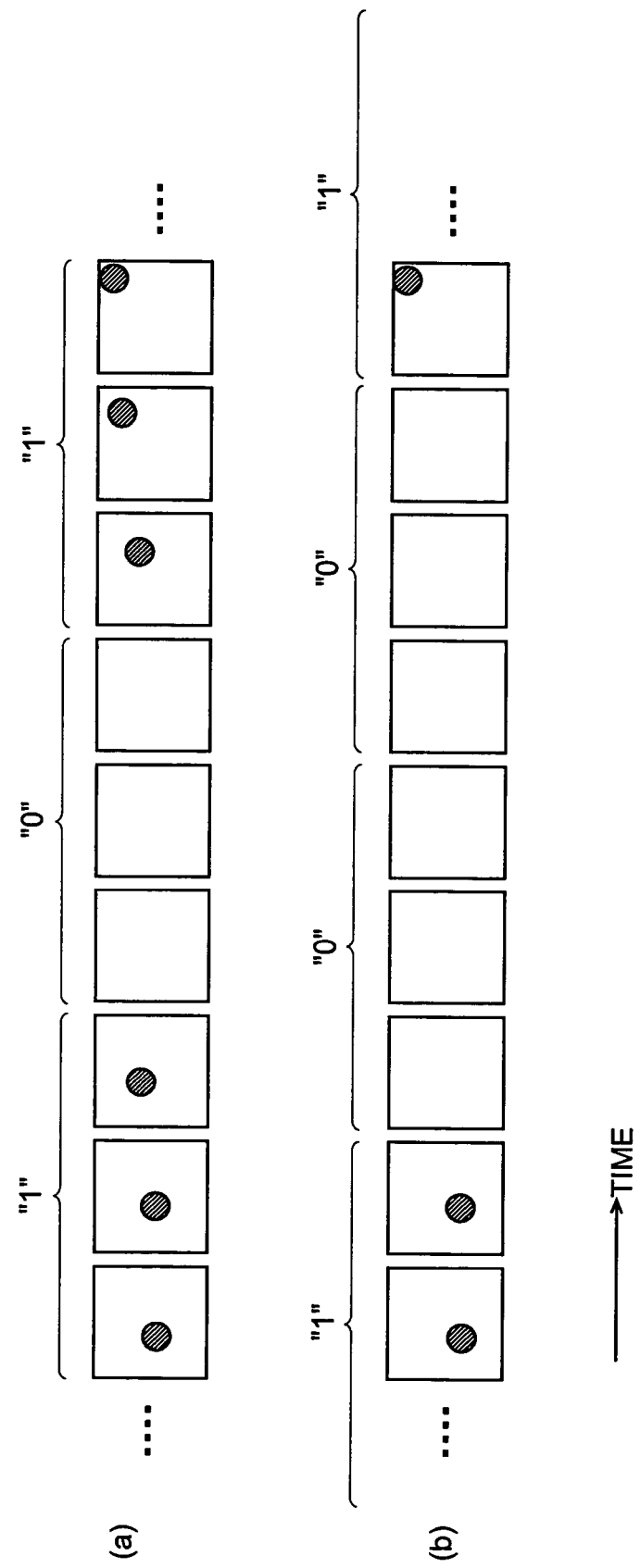
FIG. 16 is a conceptual diagram for explaining a motion-compensating process that the information terminal of the embodiment performs when it decodes ID information.

Also in the process of obtaining a number of frames of ID images, it is probable that a camera shake or similar accidental motion causes the ID-receiving area to relatively move as in the case of the detection of the pilot signal. Such a motion must be also compensated for to keep track of the ID-receiving area. FIG. 16 is a conceptual diagram for explaining a method of tracking the ID light, where diagram (a) shows a series of ID images with one "0" bit and diagram (b) shows another series of ID images with two "0" bits. The ID images are obtained at a high rate, e.g. 1.2 kHz, and each triplet of the images represents one bit of data.

As shown in FIG. 16, the ID-receiving area is not present in the ID images during the "0" period, whereas the area is moving during the "1" period. To correctly decode the ID signal, it is necessary to track the motion of the ID-receiving area. Accordingly, a motion vector is calculated for each ID image, using the same technique as used in the motion-compensating process for detecting the pilot signal. That is, the motion vector is calculated on the basis of a cross correlation or the sum of absolute differences between neighboring frames of the ID images, and the motion of the ID-receiving area is estimated from the motion vector. However, it is impossible to calculate a motion vector during a "0" period. To solve this problem, it is desirable to associate the motion vector with history data so that the motion can be estimated even during a period where the ID-receiving area is absent.

More specifically, with $m_{i-1}$ denoting the final motion vector obtained in the previous frame and $m_{i,0}$ denoting the temporary motion vector obtained in the current frame (this vector should be rounded off to zero vector if the sum of the absolute differences is equal to or smaller than a threshold), the motion vector $m_i$ to be finally obtained in the current frame can be defined as:

$$m_i = \beta m_{i-1} + (1-\beta) m_{i,0}$$

where β is a damping factor that satisfies 0<β≦1. This equation can be used to obtain a motion vector for an ID-image frame in which no ID-receiving area is present (i.e. the optical beacon is off). However, this motion vector does not have a good response to a sudden increase in the motion speed. One solution to this problem is to switch β to zero for an ID-image frame in which an ID-receiving area is present so that the temporary motion vector $m_{i,0}$ is used as the final motion vector ($m_i = m_{i,0}$). According to this method, the calculation using the above equation is performed for only those ID-image frames in which no ID-receiving area is present. With the motion vector thus calculated, the pixel range from which pixel signals are to be read out to create an ID image is shifted according to the motion vector. Thus, the present method can assuredly track the ID-receiving area.

As explained earlier, the information terminal 1 uses ID information to identify each information device, collect resources associated with the identified device and display a corresponding icon on the screen 21a. More specifically, the icon is displayed for the first time after its "score" has reached to a predetermined level. While the corresponding ID is not recognized, the score gradually decreases at a constant rate down to a predetermined lower limit (the score will never be smaller than this limit). In contrast, every time the ID information is detected, the score increments by a predetermined value. When the corresponding ID information has been detected a certain number of times and the score has exceeded a predetermined upper limit, the ID is regarded as "recognized" and an icon is displayed at the corresponding position on the display 21a.

The score of an ID thus recognized starts decreasing at the constant rate if the corresponding ID signal becomes undetectable. However, if the same ID is detected again before the score reaches the lower limit, the score is restored to the upper limit. If the ID remains undetected for such a long length of time that allows the score to reach the lower limit, the ID is regarded as "lost" and the corresponding icon is removed from the screen 21a. If the icon is engaged in a certain operation (for example, when the information device corresponding to this icon is being controlled or a drag and drop or some other operation is being performed on the icon), the removal of the icon is delayed until a predetermined period of time lapses after the end of the operation.

The above-described scoring technique controls the creation and removal of the icon corresponding to each ID on the screen so that the displayed icons become stable and easy to operate. Without this technique, ID information that has been decoded would be immediately used "as is" to create a corresponding icon on the screen 21a, in which case the image on the screen would be unstable. For example, while receiving ID light from the optical beacon of an information device, the information terminal 1 may temporarily encounter an error or become unable to receive the ID light due to disturbance from external light or blocking of the ID light. Also, an erroneous reception of the pilot signal may occur due to a motion of the information device, in which case the ID cannot be correctly obtained. Such accidents would make a new icon suddenly appear only for a short period of time or an existing icon frequently disappear only for a short period of time.

It should be noted that the numerical values used in the present embodiment (e.g. the number of levels or pixels used in the process of locating the ID position) are mere examples and may be changed according to necessity. Also, the process of detecting ID signals or decoding the ID information may follow some other steps that are different from those shown in the flowchart of FIG. 7 or 15.

EXAMPLE

This section describes the result of an experiment using a simplified, trial version of the "OPTO-NAVI" system developed by the present inventors and others.

The trial system used the image sensor disclosed in Non-Patent Document 2 as the image sensor 11 in FIG. 3. This image sensor can simultaneously receive up to seven ID signals (i.e. $n_{ID}=7$) with a frame rate of 1.2 kfps per ID for capturing ID images from which the ID information is to be read out.

The system also included a camera, which substituted for the information terminal 1 of the remote control system shown in FIG. 2, and three ID transmission modules, which correspond to the information devices. Each transmission module had a red LED as the ID light source, which corresponds to the optical beacon of the information device. The purpose of using the visible light (i.e. red light) was to make the light source easy to handle in the experiment. In practical applications, however, it is desirable to use near-infrared light, which is invisible to our eyes.

Each ID transmission module generated a binary signal modulated at a frequency of 400 Hz. The transmitted data was a Manchester-coded bit string consisting of a preamble of "111 111 110" followed by a 4-bit binary data representing an ID code. Under such a modulating condition, each bit of the Manchester-coded bit string is transmitted at intervals of 2.5 ms (=1/400 second) and represented by three frames of ID images (=1.2 kfps/400 Hz). In addition, the ID light source was turned on and off at intervals of 100 ms to superimpose a pilot signal of 5 Hz on the ID signal.

The three ID transmission modules were set in a room and configured to transmit the following ID codes: 2, 9 and 13, respectively. The distance from the camera to each ID transmission module was approximately from 1 m (to the nearest) to 3 m (to the farthest). The binning process for detecting the pilot signal was performed at three levels.

Under the above-described conditions, the three ID transmission modules were simultaneously imaged by the camera, and the process for obtaining IDs from the captured image was performed. The result showed that the ID code of each ID transmission module was correctly extracted from a series of images captured with the camera. The ID information thus extracted makes it possible to identify each information device and perform various kinds of operations on a desired information device.

What is claimed is:

1. An information-processing device having the following functions:
   performing free-space optical communication to receive predetermined pieces of information from a remote transmitter device having a light source that emits light containing at least the aforementioned pieces of information;
   capturing an image of a certain imaging range; and
   obtaining position information of the light emitted from the light source of the transmitter device present within the imaging range in parallel to capturing plural frames of images of the same imaging range, and the information-processing device includes:
   a) an imaging device including a photo-receiver having a two-dimensional array of normal pixel cells, each of which performs photoelectric conversion, and a readout circuit for reading out a pixel signal produced by the photoelectric conversion at each pixel cell;

b) a binning processor for creating a set of binned images having different resolutions from each frame of the image, where each binned image is created using signals of expanded pixel cells, each of which is created by virtually adding pixel signals of adjacent pixel cells selected from all the normal pixel cells of the imaging device;

c) an evaluator for processing the signal of a given normal or expanded pixel cell to determine whether the pixel cell is receiving the light emitted from the light source, by analyzing a predetermined number of frames of images that are temporally adjacent to or in proximity to each other and calculating an evaluation index that reflects a presence of the emitted light; and d) a pixel cell locator for performing a process including the following steps:

(d1) locating one or more expanded pixel cells that are receiving the light emitted from the light source within the binned image having the lowest resolution created by the binning processor, based on the evaluation indexes that the evaluator has given to the expanded pixel cells of the binned image concerned;

(d2) defining a limited range within the binned image having the next lowest resolution, including the one or more expanded pixel cells located in the previous step;

(d3) locating one or more expanded or normal pixel cells that are receiving the light emitted from the light source within the aforementioned limited range of the binned image, based on the evaluation indexes that the evaluator has given to the expanded or normal pixel cells included in the aforementioned limited range; and (d4) returning to step (d2) until one or more normal pixel cells that are receiving the light emitted from the light source are located in step (d3).

2. The information-processing device according to claim 1, wherein the evaluator calculates the evaluation index of each normal or expanded pixel cell by an evaluation function that performs a fast Fourier-transformation on the predetermined number of frames of images.

3. The information-processing device according to claim 1, wherein the evaluator uses different evaluation functions having different levels of accuracy corresponding to the different levels of resolutions of the images to be evaluated.

4. The information-processing device according to claim 1, wherein the evaluator calculates the evaluation index from a predetermined number of consecutive frames of images that are temporally adjacent to each other.

5. The information-processing device according to claim 4, wherein the information-processing device further includes a motion estimator for estimating a direction and/or speed of a relative motion of the light source within the imaging range, based on a series of frames of images created from the pixel signals read out from the pixel cells of the imaging device, and the evaluator calculates the evaluation index after compensating for the motion of the light source on the basis of the motion information estimated by the motion estimator.

6. The information-processing device according to claim 5, wherein the motion estimator divides the image into plural sections and estimates the motion within each section when the estimation process switches to an image having a higher resolution.

7. The information-processing device according to claim 5, wherein the motion estimator calculates a cross correlation between consecutive frames of the images and obtains information about the motion from a maximum value of the cross correlation.

8. The information-processing device according to claim 5, wherein the motion estimator estimates the amount of motion only within a limited range that includes an extent of uncertainty of the pixel position resulting from the binning process when the estimation process switches to an image having a higher resolution, on condition that a motion-compensating process has been performed on a previous, low-resolution image.

9. The information-processing device according to claim 1, wherein the binning processor creates a low-resolution image from a high-resolution image by a binning process in which each expanded pixel cell of the low-resolution image is created from a cell group consisting of a unique subset of the normal or expanded pixel cells of the high-resolution image, where any pair of the expanded pixel cells located adjacent to each other within the low-resolution image has a corresponding pair of the cell groups that partially overlap each other within the high-resolution image.

10. The information-processing device according to claim 1, wherein the binning processor logarithmically compresses the pixel value of each normal or expanded pixel cell.

11. An information-processing system, comprising:
an information-processing device according to claim 1; and
one or more transmitter devices, each having a light source for emitting at least a ray of light having a predetermined frequency,
and the system is characterized in that:
the transmitter device emits an optical signal containing a pilot signal having a first frequency and an identification signal having a frequency higher than the first frequency and containing information relating to the transmitter device concerned, where the pilot signal and the identification signal are superimposed on different frequency bands of the optical signal; and
the information-processing device recognizes a position of the transmitter device by detecting a position of the pilot signal, identifies one or more pixel cells of the photo-receiver of the imaging device of the information-processing device on the basis of the recognized position of the transmitter device, and obtains the identification signal from the pixel signals read out from the identified pixel cells.

* * * * *